(12) United States Patent
Tsuneki et al.

(10) Patent No.: US 11,592,789 B2
(45) Date of Patent: Feb. 28, 2023

(54) OUTPUT DEVICE, CONTROL DEVICE, AND METHOD FOR OUTPUTTING EVALUATION FUNCTIONS AND MACHINE LEARNING RESULTS

(71) Applicant: FANUC CORPORATION, Yamanashi (JP)

(72) Inventors: Ryoutarou Tsuneki, Yamanashi (JP); Satoshi Ikai, Yamanashi (JP); Takaki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 795 days.

(21) Appl. No.: 16/573,079

(22) Filed: Sep. 17, 2019

(65) Prior Publication Data

US 2020/0150599 A1 May 14, 2020

(30) Foreign Application Priority Data

Nov. 9, 2018 (JP) ............... JP2018-211397

(51) Int. Cl.
*G05B 13/02* (2006.01)
*G06N 20/00* (2019.01)
(Continued)

(52) U.S. Cl.
CPC ....... *G05B 13/0265* (2013.01); *G05B 13/042* (2013.01); *G06N 3/08* (2013.01); *G06N 20/00* (2019.01)

(58) Field of Classification Search
CPC .. G05B 13/0265; G05B 13/042; G06N 20/00; G06N 3/08
See application file for complete search history.

(56) References Cited

U.S. PATENT DOCUMENTS

2009/0248175 A1* 10/2009 Eguchi ............... G06N 3/08
700/29
2017/0087654 A1* 3/2017 Abe ............... B23H 7/20
(Continued)

FOREIGN PATENT DOCUMENTS

CN 106647258 A 5/2017
CN 108227482 A 6/2018
(Continued)

OTHER PUBLICATIONS

Notification of Reasons for Refusal dated Oct. 13, 2020 in corresponding Japanese Patent Application No. 2018-211397.
(Continued)

*Primary Examiner* — Vincent H Tran
(74) *Attorney, Agent, or Firm* — Wenderoth, Lind & Ponack, L.L.P.

(57) ABSTRACT

A plurality of evaluation functions and a machine learning result of each of the evaluation functions are output so that a relation between the evaluation function and the learning result can be ascertained. An output device includes: an output unit that outputs a plurality of evaluation functions used by a machine learning device that performs machine learning of parameters of components of a servo control device that controls a servo motor that drives an axis of a machine tool, a robot, or an industrial machine and a machine learning result of each of the evaluation functions; and an information acquisition unit that acquires the machine learning result from at least one of the servo control device and the machine learning device.

13 Claims, 17 Drawing Sheets

(51) Int. Cl.
    *G05B 13/04*     (2006.01)
    *G06N 3/08*     (2023.01)

(56) References Cited

U.S. PATENT DOCUMENTS

2017/0090452 A1*   3/2017   Kanemaru ............. G05B 19/19
2018/0330200 A1*  11/2018   Shibata ................... G06N 3/04
2018/0374001 A1*  12/2018   Namie ................. G05B 13/041

FOREIGN PATENT DOCUMENTS

| | | | |
|---|---|---|---|
| CN | 108628355 A | | 10/2018 |
| JP | 2018-128999 | | 8/2018 |
| JP | 2019016216 A | * | 1/2019 |
| WO | 2018/151215 | | 8/2018 |

OTHER PUBLICATIONS

Office Action dated Jun. 28, 2022 in the CN Patent Application No. 201911071925.4, 9 pages.

\* cited by examiner

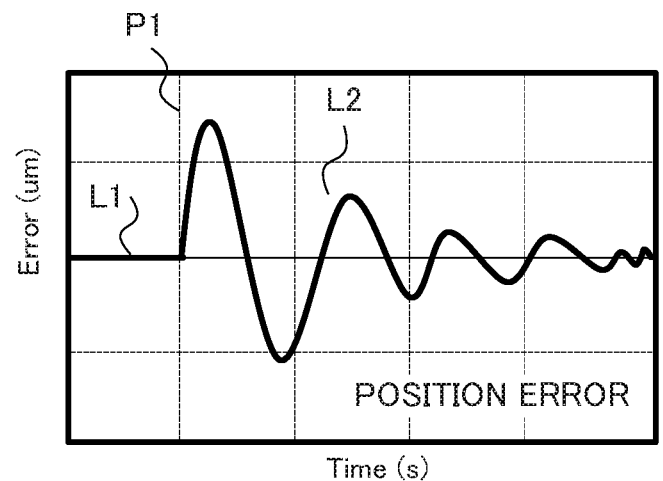
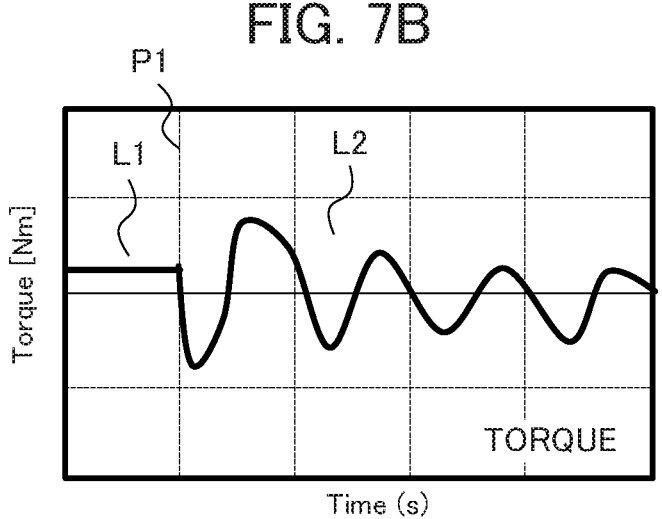

Time (s)

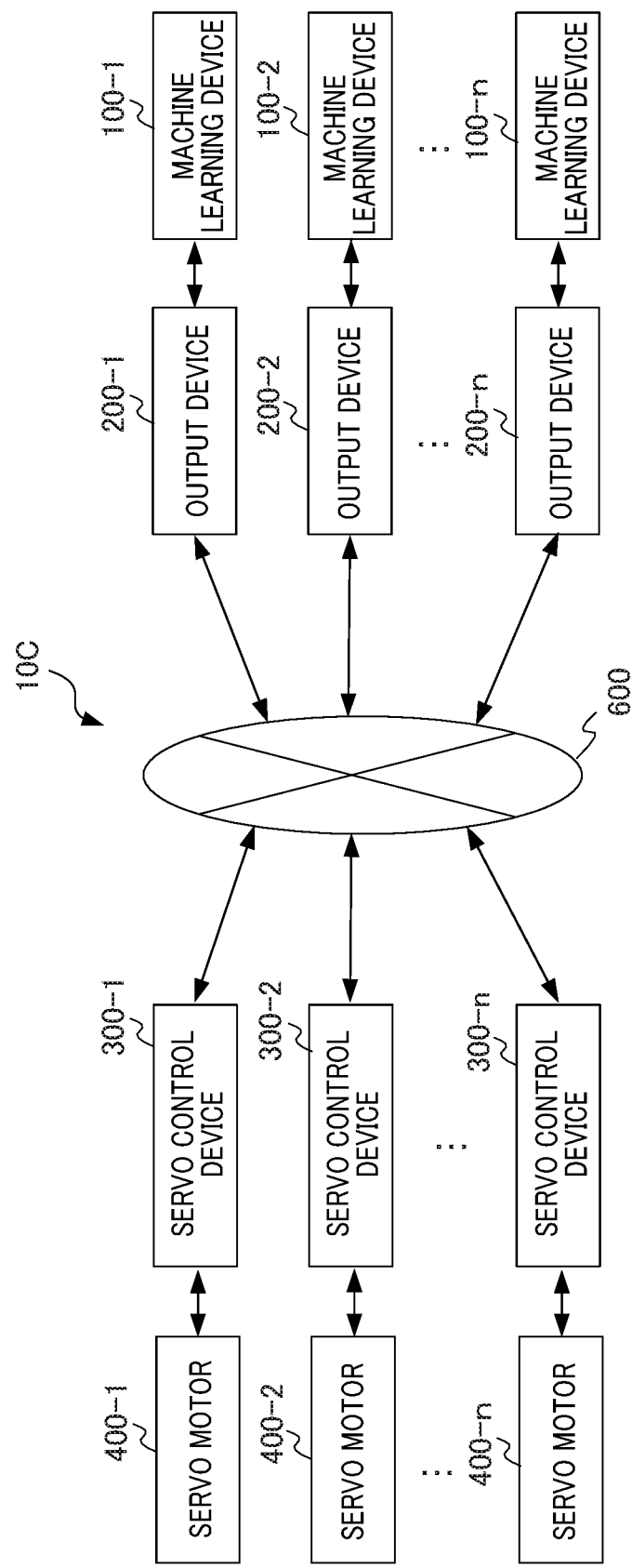

OUTPUT DEVICE, CONTROL DEVICE, AND METHOD FOR OUTPUTTING EVALUATION FUNCTIONS AND MACHINE LEARNING RESULTS

This application is based on and claims the benefit of priority from Japanese Patent Application No. 2018-211397, filed on 9 Nov. 2018, the content of which is incorporated herein by reference.

BACKGROUND OF THE INVENTION

Field of the Invention

The present invention relates to an output device, a control device, and a method for outputting evaluation functions and machine learning results. More particularly, the present invention relates to an output device that performs machine learning using each of a plurality of evaluation functions with the aid of a machine learning device that performs machine learning using an evaluation function with respect to a servo control device that controls a servo motor that drives an axis of a machine tool, a robot, or an industrial machine and outputs the plurality of evaluation functions and the machine learning results of the respective evaluation functions, a control device including the output device, and a method for outputting evaluation functions and machine learning results.

Related Art

As a technology related to the present invention, for example, Patent Document 1 discloses a control device including a feedback control unit that inputs an error between a reference command and a control amount output by an external control target to a controller that controls the error using a predetermined control parameter to control the control target with an operation amount output by the controller and an adjustment unit that adjusts the control parameter on the basis of a learning result obtained by a machine learning process. An example of a machine control system including a control device is a system that controls linear movement of a slider by controlling driving or a rotary motor. Examples of the control parameter include a position loop gain, a velocity loop gain, a velocity loop integration time constant, a torque command filter time constant, a notch filter frequency, and the like. It is also disclosed that reinforcement learning may be used as the machine learning process.

Patent Document 1: Pamphlet of PCT International Publication No. WO2018/151215

SUMMARY OF THE INVENTION

In Patent Document 1, the control parameter is adjusted on the basis of the learning result in the machine learning process which uses reinforcement learning. Since a user such as an operator cannot be involved in machine learning, there may be a case in which an error obtained by the adjustment of the control parameter is not suppressed as intended by the user. For example, a certain user may place importance on suppressing high-frequency vibration although the error is not sufficiently small whereas another user may place importance on suppressing the error to be sufficiently small although high-frequency vibration remains. Moreover, when parameters of components of a servo control device that controls a servo motor that drives an axis of a machine tool, a robot, or an industrial machine are machine-learned by a machine learning device, since an evaluation function used by the machine learning device is generally not displayed, an operator cannot understand which learning effect is obtained when a certain evaluation function is used.

An object of the present invention is to provide an output device that outputs a plurality of evaluation functions and a machine learning result of each of the evaluation functions so that a relation between the evaluation function and the learning result can be ascertained and to provide a control device including the output device and a method for outputting evaluation functions and machine learning results.

(1) An output device according to the present invention is an output device (for example, an output device 200, 200A to be described later) including: an output unit (for example, a control unit 205 and a display unit 209 or a control unit 205 and a storage unit 206 to be described later) that outputs a plurality of evaluation functions used by a machine learning device (for example, a machine learning device 100 to be described later) that performs machine learning of parameters of components of a servo control device (for example, a servo control device 300 to be described later) that controls a servo motor (for example, a servo motor 400 to be described later) that drives an axis of a machine tool, a robot, or an industrial machine and a machine learning result of each of the evaluation functions; and an information acquisition unit (for example, a learning information acquisition unit 201 or a servo information acquisition unit 207 to be described later) that acquires the machine learning result from at least one of the servo control device and the machine learning device.

(2) In the output device according to (1), the output unit may include a display unit (for example, a display unit 209 to be described later) that displays the plurality of evaluation functions and the machine learning result acquired for each of the evaluation functions on a display screen.

(3) The output device according to (1) or (2) may further include an information output unit (for example, a servo information output unit 208 to be described later) that outputs a parameter selected on the basis of the machine learning result of each of the plurality of evaluation functions from a plurality of parameters machine-learned using the plurality of evaluation functions to the servo control device.

(4) The output device according to any one of (1) to (3) may further include an information output unit (for example, a learning information output unit 202 to be described later) that outputs a change instruction to an evaluation function selected from the plurality of evaluation functions or an evaluation function different from the plurality of evaluation functions to the machine learning device.

(5) In the output device according to any one of (1) to (4), the machine learning result may be an error between a control command of the servo control device and feedback information when the servo motor was driven on the basis of the control command.

(6) In the output device according to (4) or (5), the machine learning device may store the parameters of the components of the servo control device retrieved during machine learning using the evaluation function and the machine learning result obtained by operating the servo control device using the parameters and may obtain an evaluation function value on the basis of a changed evaluation function using the stored machine learning result when machine learning is performed while changing the evaluation function on the basis of the change instruction and the same parameters as the parameters are selected.

(7) In the output device according to any one of (4) to (6), the different evaluation function may be an evaluation function of which a weighting coefficient is different from that of the plurality of evaluation functions.

(8) In the output device according to any one of (1) to (7), the plurality of evaluation functions may include an evaluation function made up of a weighted sum of a function in which a position error is a variable, a function in which a differential value of a position error is a variable, and a function in which a differential value of a torque is a variable.

(9) In the output device according to any one of (3) to (7), the parameters of the components of the servo control device may include parameters of a numerical expression model or a filter.

(10) In the output device according to (9), the numerical expression model or the filter may be included in a velocity feedforward processing unit or a position feedforward processing unit, and the parameters include coefficients of a transfer function of the filter.

(11) A control device according to the present invention is a control device including: the output device according to any one of (1) to (10);
a servo control device that controls a servo motor that drives an axis of a machine tool, a robot, or an industrial machine, and
a machine learning device that performs machine learning with respect to the servo control device.

(12) In the control device according to (11), the output device may be included in one of the servo control device and the machine learning device.

(13) An output method for allowing an output device to output an evaluation function and a machine learning result according to the present invention is an output method for allowing an output device to output an evaluation function and a machine learning result, including: outputting a machine learning result of each of the evaluation functions obtained by performing machine learning using a plurality of evaluation functions respectively with the aid of a learning device that performs machine learning using the evaluation function with respect to a servo control device that controls a servo motor that drives an axis of a machine tool, a robot, or an industrial machine; and
acquiring the machine learning result from at least one of the servo control device and the machine learning device.

According to the present invention, by outputting a plurality of evaluation functions and a machine learning result of each of the evaluation functions, a relation between the evaluation function and the learning result can be ascertained. As a result, by allowing an output device to output an instruction to a machine learning device, an evaluation function can be selected from a plurality of evaluation functions and can be changed to another evaluation function.

BRIEF DESCRIPTION OF THE DRAWINGS

FIG. 7A is a diagram illustrating an example of a characteristic diagram illustrating a relation between a machining trajectory and a time response of a position error.

FIG. 7B is a diagram illustrating an example of a time response characteristic diagram of a machining trajectory and a time response of a torque.

FIG. 20 is a block diagram illustrating a control device according to another embodiment.

DETAILED DESCRIPTION OF THE INVENTION

Hereinafter, an embodiment of the present invention will be described with reference to the drawings.

First Embodiment

Figure 1:
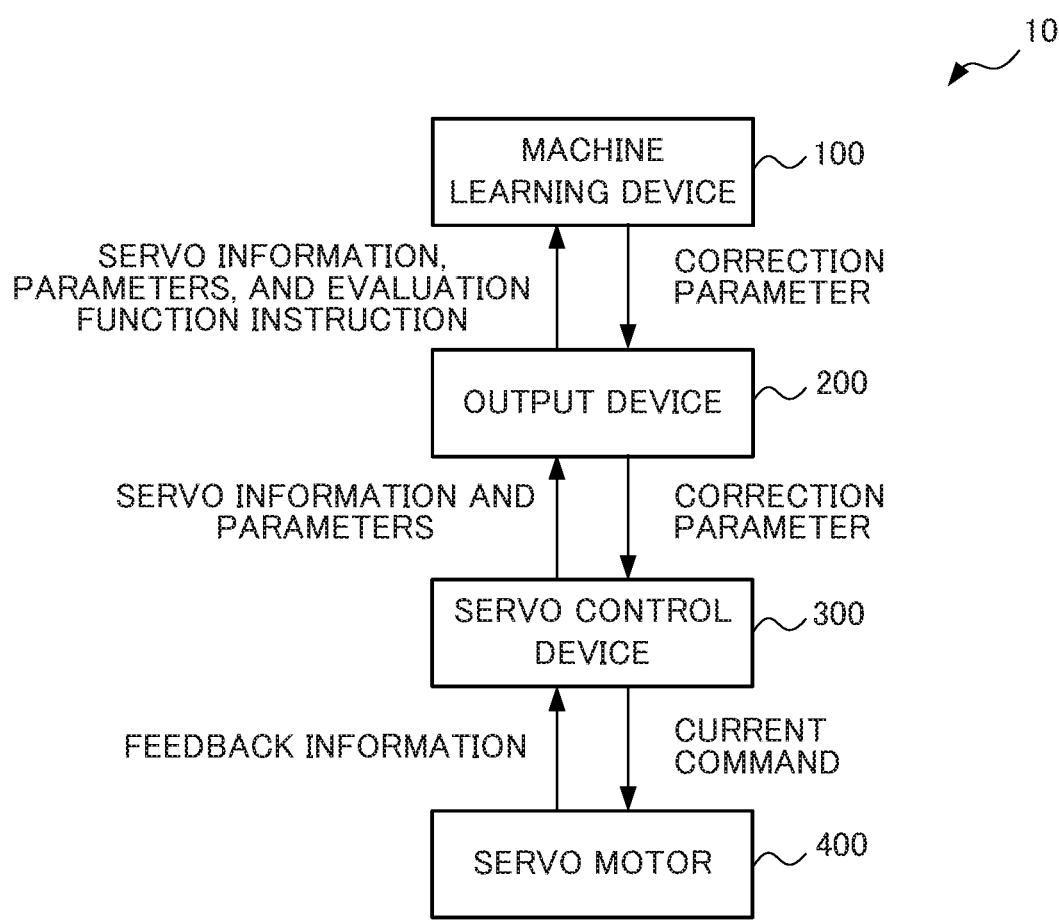
FIG. 1 is a block diagram illustrating a configuration example of a control device according to a first embodiment of the present invention.

FIG. 1 is a block diagram illustrating a configuration example of a control device according to a first embodiment of the present invention. A control device 10 illustrated in FIG. 1 includes a machine learning device 100, an output device 200, a servo control device 300, and a servo motor 400. The control device 10 drives a machine tool, a robot, or an industrial machine. The control device 10 may be provided separately from a machine tool, a robot, or an industrial machine and may be included in a machine tool, a robot, or an industrial machine.

The servo control device 300 outputs a torque command on the basis of a control command such as a position command and a velocity command and controls rotation of the servo motor 400. The servo control device 300 includes components such as, for example, a velocity feedforward processing unit represented by a transfer function including coefficients machine-learned by the machine learning device 100. The component of the servo control device 300, which is machine-learned by the machine learning device 100 is not particularly limited to the velocity feedforward processing unit but may be a notch filter, for example. The velocity feedforward processing unit performs a process indicated by a transfer function F(s) represented by Expression 1 (indicated by Math. 1 below) with respect to an input position command and adds a processing result to a torque command as a velocity feedforward term. The optimal values of the coefficients $a_i$ and $b_j$ ($0 \leq i \leq m$, $0 \leq j \leq n$, and m and n are natural numbers) of Expression 1 are machine-learned by the machine learning device 100. The details of a configuration of the servo control device 300 will be described later.

$$F(s) = \frac{b_0 + b_1 s + b_2 s^2 + \ldots + b_n s^n}{a_0 + a_1 s + a_2 s^2 + \ldots + a_m s^m} \quad \text{[Math. 1]}$$

The servo motor 400 drives an axis of a machine tool, a robot, or an industrial machine. The servo motor 400 is included in a machine tool, a robot, or an industrial machine, for example. The servo motor 400 outputs a detected position and/or a detected velocity to the servo control device 300 as feedback information. The servo control device 300 obtains a difference between a position command and the detected position as a position error and obtains a difference between a velocity command and the detected velocity as a velocity error.

The output device 200 acquires a control command such as a position command, a velocity command, and a torque command and servo information including a position error, a velocity error, and the like output from the servo control device 300 to output the obtained command and information to the machine learning device 100. Moreover, the output device acquires the coefficients (parameters) of a transfer function of a velocity feedforward processing unit of the servo control device from the servo control device 300 and outputs the coefficients to the machine learning device 100.

The machine learning device 100 finely adjusts the coefficients of the transfer function of the velocity feedforward processing unit so that the coefficients (parameters) of the transfer function of the velocity feedforward processing unit approach the optimal values to obtain correction parameters by performing machine learning on the basis of a predetermined evaluation function and outputs the correction parameters to the servo control device 300 via the output device 200.

The servo control device 300 changes the coefficients of a transfer function of the velocity feedforward processing unit on the basis of the correction parameters to drive the servo motor 400. Moreover, the output device 200 acquires a control command such as a position command, a velocity command, and a torque command and servo information including a position error and a velocity error based on the correction parameters from the servo control device 300 and outputs the acquired command and information to the machine learning device 100. The control device 10 repeatedly performs the above-described operations whereby the machine learning device 100 obtains the optimal values of the coefficients of the transfer function of the velocity feedforward processing unit.

The above-described operations are the basic operations of the control device 10 for obtaining the optimal values of the coefficients of the transfer function of the velocity feedforward processing unit. In the present embodiment, the output device 200 outputs a plurality of evaluation functions and learning results such as a time response or a frequency response of a position error obtained by driving the servo control device using the parameters obtained by machine learning based on each of the evaluation functions. When learning results such as a time response or a frequency response of a position error are output using a display device, it is possible to display a plurality of learning results on a display screen in parallel for respective evaluation functions or to display the plurality of learning results on a display screen so as to be superimposed on each other. As a result, a user can easily compare the learning results of the respective evaluation functions. The plurality of evaluation functions output by the output device 200 may be set by a user, and a manufacturer of a machine tool may set the plurality of evaluation functions in advance. As will be described later, a part or all of the plurality of evaluation functions can be changed to another evaluation functions by changing a weighting coefficient. Examples of a method for outputting information from the output device 200 include display on a screen using a liquid crystal display, printing on a sheet using a printer or the like, storage in a storage unit such as a memory, and signal output to an external device via a communication unit.

When an evaluation function with which a learning result intended by a user is obtained is selected, the output device 200 outputs parameters obtained by the evaluation function with which an intended learning result is obtained to the servo control device 300. In this way, a predetermined evaluation function can be selected from a plurality of evaluation functions so that a learning result intended by the user is obtained. The output device 200 outputs evaluation function instruction information of the selected evaluation function to the machine learning device 100. The evaluation function instruction information includes a weighting coefficient value of the evaluation function, the identification information of the evaluation function, and the like. The machine learning device 100 sets the selected evaluation function as an evaluation function to be used when performing machine learning. When a learning result intended by the user is not obtained from the learning result such as a time response or a frequency response of the position error output from the output device 200, the output device 200 changes a part or all of the plurality of evaluation functions on the basis of an operation of a user. Changing of the evaluation function includes changing a weighting coefficient of an evaluation function to another value or changing the type of an evaluation function, for example. The output device 200 outputs evaluation function instruction information to the machine learning device 100 in order to set or change the weighting coefficient of an evaluation function or the type of the evaluation function to be used by the machine learning device 100.

The machine learning device 100 sets or changes the evaluation function on the basis of the evaluation function instruction information. The machine learning device 100 learns by outputting correction parameters obtained by finely adjusting the coefficients of the transfer function using the set or changed evaluation function to the servo control device 300 via the output device 200 so that the coefficients (parameters) of the transfer function of the velocity feedforward processing unit, for example, approach optimal values.

The output device 200 acquires the servo information of the position error from the servo control device 300 driven on the basis of the correction parameters and outputs information including the set or changed evaluation function and a learning result such as a time response or a frequency response of the position error. In this way, the user can set or change the evaluation function so that a learning result intended by the user is obtained.

Although a time response or a frequency response of the position error is illustrated as an example of the machine learning result, the machine learning result is not limited thereto. For example, a frequency response obtained from the transfer function of the velocity feedforward processing unit set to the machine-learned coefficient may be used as the learning result. Software capable of analyzing a frequency response from the transfer function is known, and for example, the following software can be used.
https://jp.mathworks.com/help/signal/ug/frequency-response.html
https://jp.mathworks.com/help/signal/ref/freqz.html
https://docs.scipy.org/doc/scipy-0.19.1/reference/generated/scipy.signal.freqz.html
https://wiki.octave.org/Control_package An attenuation central frequency fc, a bandwidth fw, and an attenuation coefficient R can be obtained from the frequency response. The machine learning result may be illustrated using a graph showing the time response or the frequency response of a position error and may be illustrated using a table. When the machine learning result is the time response or the frequency response of a position error, the output device 200 can acquire the position error from the machine learning device 100 or the servo control device 300. When the machine learning result is a frequency response obtained from the transfer function of a velocity feedforward processing unit, the output device 200 can acquire the transfer function from the servo control device 300.

Hereinafter, the respective components of the control device 10 according to the first embodiment will be described in further detail.

In the following description, the output device 200 will be described first, and then, the machine learning device and the servo control device 300 will be described.

<Output Device 200>

The output device 200 has an output function of outputting a plurality of evaluation functions and a learning result such as a time response of a position error corresponding to each evaluation function. Moreover, the output device 200 has an adjustment function of performing control (for example, an evaluation function change instruction with respect to a machine learning device and a program activation instruction with respect to a machine learning device) of the operation of the machine learning device 100. Furthermore, the output device 200 also has a relay function of relaying information (for example, a control command such as a position command, a velocity command, and a torque command, a position error, and the coefficients of the velocity feedforward processing unit) from the servo control device 300 to the machine learning device 100 and information (for example, the corrected coefficients $a_i$ and $b_j$ of the velocity feedforward processing unit) from the machine learning device 100 to the servo control device 300. The control of operations and the relay of information are performed via a learning information acquisition unit 201, a servo information acquisition unit 207, a learning information output unit 202, and a servo information output unit 208 to be described later.

Figure 2:
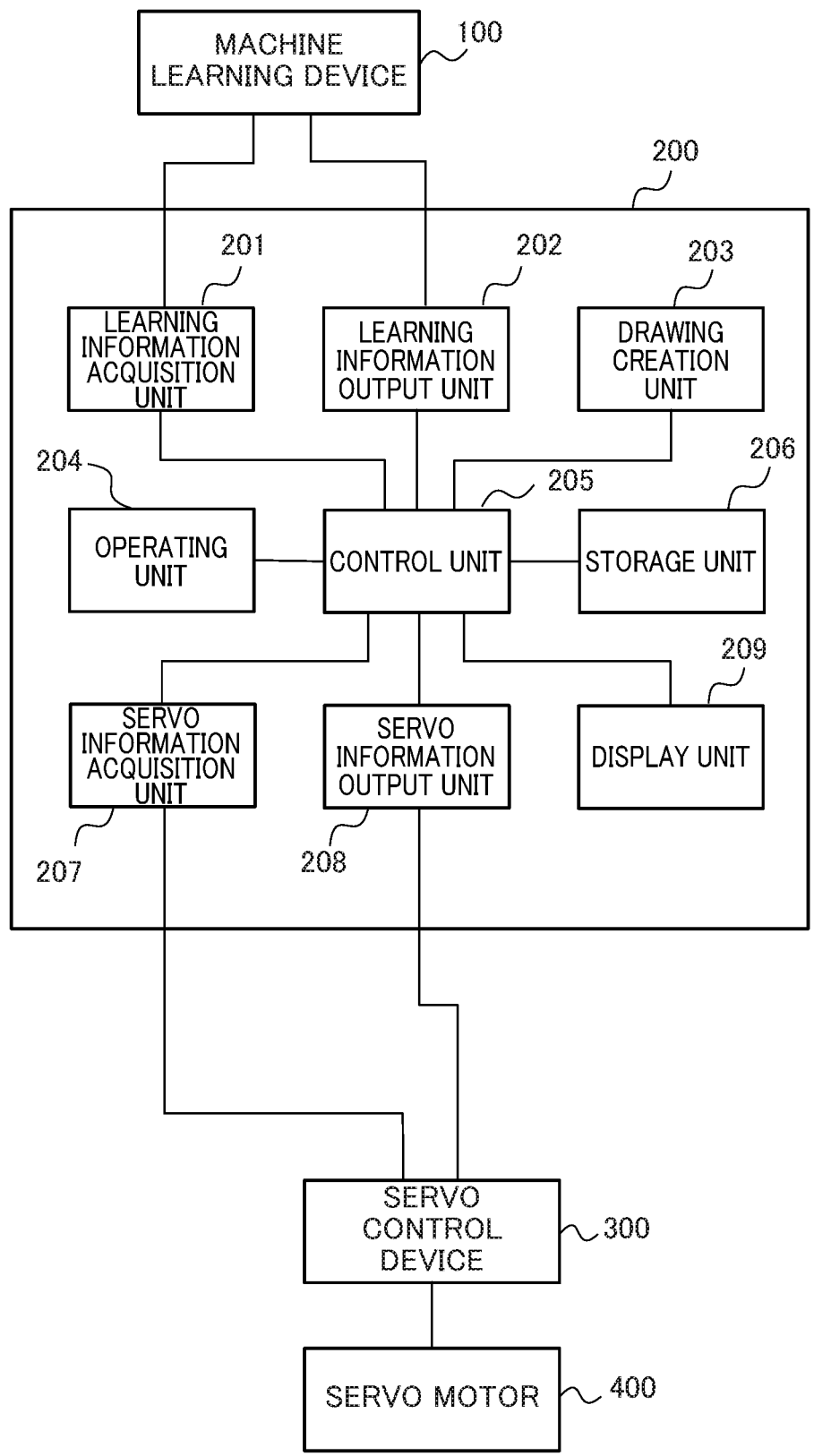
FIG. 2 is a block diagram illustrating a configuration example of an output device included in the control device according to the first embodiment of the present invention.

FIG. 2 is a block diagram illustrating a configuration example of the output device 200 included in the control device 10 according to the first embodiment of the present invention. As illustrated in FIG. 2, the output device 200 includes a learning information acquisition unit 201, a learning information output unit 202, a drawing creation unit 203, an operating unit 204, a control unit 205, a storage unit 206, a servo information acquisition unit 207, a servo information output unit 208, and a display unit 209.

The learning information acquisition unit 201 acquires the correction parameters (for example, the corrected coefficients $a_i$ and $b_j$ of the velocity feedforward processing unit 308) from the machine learning device 100. The learning information output unit 202 outputs servo information indicating a servo state including a control command such as a position command, a velocity command, and a torque command and a feedback such as a position error, a velocity error, and a current error, and parameters (for example, the corrected coefficients $a_i$ and $b_j$ of the velocity feedforward processing unit 308) to the machine learning device 100. The drawing creation unit 203 reads a set of position errors stored in the storage unit 206 to create image information of a time response characteristic diagram or a frequency response characteristic diagram to be displayed on the display unit 209. The operating unit 204 is a mouse, a keyboard, or the like and inputs instructions and data to the control unit 205. The servo information acquisition unit 207 acquires servo information indicating a servo state including a control command such as a position command, a velocity command, and a torque command and a feedback such as a position error, a velocity error, and a current error, and parameters (for example, the corrected coefficients $a_i$ and $b_j$ of the velocity feedforward processing unit 308) from the servo control device 300. The servo information output unit 208 outputs the correction parameters output from the machine learning device 100 to the velocity feedforward processing unit 308 of the servo control device 300. The display unit 209 is a liquid crystal display, a printer, or the like and outputs information including an evaluation function and a time response characteristic diagram of a position error. The control unit 205 and the display unit 209 serve as an output unit that outputs an evaluation function and a diagram showing a time response of a position error acquired by driving the servo control device 300 on the basis of parameters (for example, the coefficients $a_i$ and $b_j$ of the velocity feedforward processing unit) learned with the evaluation function. The output includes storing information in the storage unit 206, and in this case, the output unit is the control unit 205 and the storage unit 206. Examples of an evaluation function which can be displayed on the display unit 209 of the output device 200 and can be used by the machine learning device 100 are as follows. The following functions can be used as the evaluation function f when a position error is e and a torque is Tm, for example.

$$\min \int \left( \alpha |e|^2 + \beta \left| \frac{de}{dt} \right|^2 + \gamma \left| \frac{dT_m}{dt} \right|^2 \right) dt \quad \text{[Math. 2]}$$

$$\min \int \left( \alpha |e|^2 + \gamma \left| \frac{dT_m}{dt} \right|^2 \right) dt \quad \text{[Math. 3]}$$

$$\min \int_{t_0}^{t_1} |e(t)|^2 dt \quad \text{[Math. 4]}$$

$$\min \int |e(t)|^2 dt \quad \text{[Math. 5]}$$

$$\min \max \{e(t)\} \quad \text{[Math. 6]}$$

In Expressions 2 to 6, $\alpha$, $\beta$, and $\gamma$ are weighting coefficients, min indicates the smallest value, max indicates the largest value. In addition to these functions, the following functions can be used. A function that calculates an integrated value of an absolute value of a position error $$\int |e| dt$$

A function that calculates an integrated value by a weighting an absolute value of a position error with time $$\int t |e| dt$$

A function that calculates an integrated value of a 2n-th power (n is a natural number) of an absolute value of a position error $$\int e^{2n} dt \text{ (n is a natural number)}$$

A function that calculates a maximum value of an absolute value of a position error $$\text{Max}\{|e|\}$$

The evaluation function of Expression 2 is an evaluation function made up of a weighted sum of a function in which a position error is used as a variable, a function in which a differential value of the position error is used as a variable, and a function in which a differential value of a torque is used as a variable. The control unit 205 outputs a part or all of the evaluation functions and a learning result such as a time response of a position error corresponding to each evaluation function to the display unit 209. The control unit 205 outputs evaluation function instruction information for setting or changing a weighting coefficient of an evaluation function to be used by the machine learning device 100 or the type of an evaluation function to the machine learning device 100 according to an instruction from a user.

Hereinafter, the output device 200 will be described in further detail on the basis of Specific Examples 1 to 5.

Figure 3:
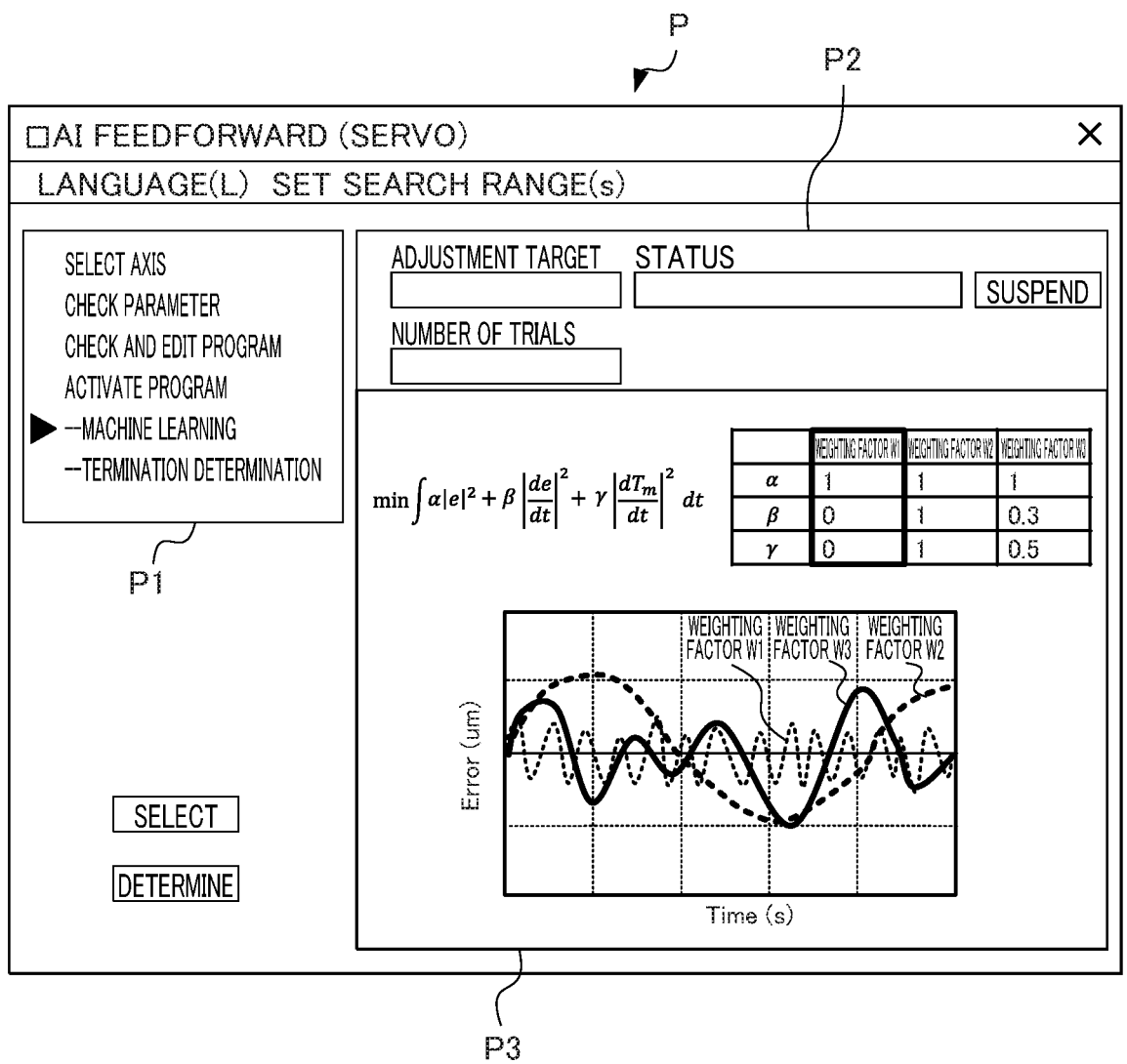
FIG. 3 is a diagram illustrating an example of a display screen displaying a plurality of evaluation functions set by a weighting coefficient and a graph obtained by superimposing time responses of position errors based on parameters learned with these evaluation functions.

Specific Example 1: Example of Plurality of Evaluation Functions Having Plurality of Different Weighting Coefficients FIG. 3 is a diagram illustrating an example of a display screen displaying a plurality of evaluation functions set by a weighting coefficient and a graph obtained by superimposing time responses of position errors based on parameters learned with these evaluation functions. In this specific example, an operation when the output device 200 outputs evaluation functions (hereinafter referred to as "evaluation functions of weighting factors W1 to W3") in which weighting factor values W1 to W3 are set to the weighting coefficients $\alpha$, $\beta$, and $\gamma$ of the evaluation function of Expression 2 and a graph obtained by superimposing time responses of three position errors acquired by driving the servo control device 300 on the basis of the parameters learned with the evaluation functions of the weighting factors W1 to W3 will be described. The number of evaluation functions is not particularly limited to three but two or four or more evaluation functions may be used.

As illustrated in FIG. 3, a display screen P includes sections P1, P2, and P3. In the section P1, for example, selection options such as select axis, check parameter, check and edit program, machine learning, and termination determination are displayed. In the section P2, for example, an adjustment target such as velocity feedforward, a status (state) such as data is being capturing, the number of trials indicating a present cumulative number of trials with respect to a predetermined number of trials (hereinafter also referred to as a "largest number of trials") up to the end of machine learning, and a button for selecting suspension of learning are displayed. In the section P3, for example, the evaluation function illustrated in Expression 2, a table showing three setting examples (weighting factors W1 to W3) of the weighting coefficients $\alpha$, $\beta$, and $\gamma$ of the evaluation function, and a graph obtained by superimposing time responses for the respective weighting factors W1 to W3 of the position error acquired on the basis of the parameters learned with the evaluation function are displayed. A graph showing a time response of a position error is not displayed before learning is performed.

As will be described later, the control unit 205 displays the evaluation function illustrated in Expression 2, a table showing three setting examples (weighting factors W1 to W3) of the weighting coefficients $\alpha$, $\beta$, and $\gamma$ of the evaluation function, and a diagram showing time responses for the respective weighting factors W1 to W3 of the position error acquired on the basis of the parameters learned with the evaluation function on the display unit 209.

When a user such as an operator selects "machine learning" in the section P1 of the display screen P illustrated in FIG. 3 of the display unit 209 and further selects the column of the weighting factor W1 of the weighting coefficients $\alpha$, $\beta$, and $\gamma$ in the table of the section P3, the control unit 205 indicates the column of the weighting factor W1 by a bold rectangle so that the weighting coefficients $\alpha$, $\beta$, and $\gamma$ in the column can be edited. Subsequently, the user inputs $\alpha=1$, $\beta=0$, and $\gamma=0$, for example, and selects "select" in the section P3 of the display screen P. Although the weighting coefficients $\alpha$, $\beta$, and $\gamma$ are input by the user in this example, the weighting coefficients may be set in advance. The control unit 205 transmits evaluation function instruction information including the identification information of the evaluation function of Expression 2 and the weighting coefficients ($\alpha=1$, $\beta=0$, and $\gamma=0$) of the weighting factor W1 to the machine learning device 100 via the learning information output unit 202.

The machine learning device 100 changes the evaluation function to the evaluation function of Expression 2 of the weighting coefficients ($\alpha=1$, $\beta=0$, and $\gamma=0$) on the basis of the evaluation function instruction information and starts machine learning on the basis of the evaluation function. The machine learning device 100 transmits the correction parameters to be used in machine learning (trial) and the number of trials to the output device 200 (the learning information acquisition unit 201) in order to perform the machine learning (trial) while finely adjusting the coefficients of the transfer function of the velocity feedforward processing unit so that the coefficients (parameters) of the transfer function of the velocity feedforward processing unit approach optimal values. The output device 200 (the servo information output unit 208) outputs the correction parameters received from the machine learning device 100 to the servo control device 300.

The servo control device 300 changes the coefficients of the transfer function of the velocity feedforward processing unit on the basis of the correction parameters received from the output device 200 (the servo information output unit 208) to drive the servo motor 400 and performs machine learning (trial). After the trial ends, the output device 200 (the servo information acquisition unit 207) acquires servo information including a control command such as a position command, a velocity command, and a torque command during the trial and a position error, a velocity error, and a current error based on the correction parameters from the servo control device 300 and stores the position error, the velocity error, and the like in the storage unit 206. Moreover, the output device 200 (the learning information output unit 202) outputs the acquired servo information to the machine learning device 100. Whenever the learning (trial) is performed, the machine learning device 100 stores the coefficients (parameters) of the transfer function and the servo information and the learning result (a time response or a frequency response of the position error) obtained by operating the servo control device 300 using the parameters in a storage unit (not illustrated). By doing so, as will be described later, when the evaluation function is changed on the basis of the evaluation function instruction information (a change instruction) to machine-learn the coefficients (parameters) of the transfer function again, it is possible to obtain the evaluation function value with the changed evaluation function using the stored servo state and learning result without driving the servo motor 400 when the same parameters as the parameters stored in the storage unit are selected during the machine learning (trial). In this way, it is possible to eliminate an operation of operating the servo control device 300 with the same parameters to obtain the servo state and the learning result and to improve the efficiency of machine learning.

The control unit 205 displays velocity feedforward in the adjustment target field of the section P2 of the display screen P illustrated in FIG. 3 and displays data capturing in the status field of the section P2 when the number of trials has not reached a predetermined number of trials. Furthermore, the control unit 205 displays the ratio of the number of trials to the largest number of trials in the number of trials field of the section P2. The control unit 205 continues the above-described operation when the number of trials has not reached the predetermined number of trials.

The machine learning device 100 performs learning with the evaluation function represented by Expression 2 of the weighting coefficient ($\alpha=1$, $\beta=0$, and $\gamma=0$) by a predetermined number of trials, and the control unit 205 passes control to the drawing creation unit 203 when the output device 200 (the control unit 205) determines that the number of trials has reached the predetermined number of trials on the basis of the information of the number of trials from the machine learning device 100.

The drawing creation unit 203 reads the set of position errors stored in the storage unit 206 to create image information of a time response characteristic diagram, stores the image information in the storage unit 206 and passes control to the control unit 205. The control unit 205 displays the time response characteristic diagram of the position error in the section P3 of the display screen P as illustrated in FIG. 3.

The control unit 205 displays a characteristic diagram having the time response curve of the weighting factor W1 illustrated in FIG. 3 in the section P3 of the display screen P, and subsequently, when the column of the weighting factor W2 in the table of the section P3 of the display screen P, for example, is selected by a user, the control unit 205 moves the part indicated by the bold rectangle in the table from the column of the weighting factor W1 to the column of the weighting factor W2 so that the weighting coefficients $\alpha$, $\beta$, and $\gamma$ of the column of the weighting factor W2 can be edited.

When a user inputs $\alpha=1$, $\beta=1$, and $\gamma=1$, for example, and selects "select" in the section P3 of the display screen P, the control unit 205 transmits evaluation function instruction information including the identification information of the evaluation function of Expression 2 and the weighting coefficient ($\alpha=1$, $\beta=1$, and $\gamma=1$) of the weighting factor W2 of the evaluation function to the machine learning device 100 via the learning information output unit 202. The operations of the machine learning device 100 having received the evaluation function instruction information and the output device 200 having transmitted the evaluation function instruction information are similar to the operations for obtaining the characteristic diagram having the time response curve of the weighting factor W1 except that the machine learning device 100 performs learning with the evaluation function represented by Expression 2 of the weighting coefficient ($\alpha=1$, $\beta=1$, and $\gamma=1$) by a predetermined number of trials, the drawing creation unit 203 superimposes the time response curve of the weighting factor W2 on the characteristic diagram having the time response curve of the weighting factor W1 to create image information of a new characteristic diagram after the machine learning of the predetermined number of trials ends, and the control unit 205 displays the characteristic diagram having the time response curve of the weighting factor W1 and the time response curve of the weighting factor W2 in the section P3 of the display screen P.

The control unit 205 displays a characteristic diagram having the time response curves of the weighting factors W1 and W2 illustrated in FIG. 3 in the section P3 of the display screen P, and subsequently, when the column of the weighting factor W3 in the table of the section P3 of the display screen P, for example, is selected by a user, the control unit 205 moves the part indicated by the bold rectangle in the table from the column of the weighting factor W2 to the column of the weighting factor W3 so that the weighting coefficients $\alpha$, $\beta$, and $\gamma$ of the column of the weighting factor W3 can be edited. When a user inputs $\alpha=1$, $\beta=0.3$, and $\gamma=0.5$, for example, and selects "select" in the section P3 of the display screen P, the control unit 205 transmits evaluation function instruction information including the identification information of the evaluation function of Expression 2 and the weighting coefficient ($\alpha=1$, $\beta=0.3$, and $\gamma=0.5$) of the weighting factor W3 of the evaluation function to the machine learning device 100 via the learning information output unit 202. The operations of the machine learning device 100 having received the evaluation function instruction information and the output device 200 having transmitted the evaluation function instruction information are similar to the operations for obtaining the characteristic diagram having the time response curve of the weighting factor W1 except that the machine learning device 100 performs learning with the evaluation function represented by Expression 2 of the weighting coefficient ($\alpha=1$, $\beta=0.3$, and $\gamma=0.5$) by a predetermined number of trials, the drawing creation unit 203 superimposes the time response curve of the weighting factor W3 on the characteristic diagram having the time response curves of the weighting factors W1 and W2 to create image information of a new characteristic diagram after the machine learning of the predetermined number of trials ends, and the control unit 205 displays the characteristic diagram having the time response curves of the weighting factors W1, W2, and W3 in the section P3 of the display screen P.

In this way, the characteristic diagram having the time response curves of the weighting factors W1, W2, and W3 is displayed in the section P3 of the display screen P and an output function and a relay function operate. The user can select and adjust the weighting factor of the evaluation function by looking at the time responses of the position errors corresponding to the plurality of evaluation functions.

In the display screen P illustrated in FIG. 3, selecting of the "select" button may be performed after input of the weighting coefficients $\alpha$, $\beta$, and $\gamma$ of W1, W2, and W3 in the table is completed. In this case, the machine learning device 100 performs machine learning up to the predetermined number of trials sequentially using the evaluation functions of the weighting factors W1, W2, and W3, for example, and performs machine learning by changing the evaluation function when the machine learning with the respective evaluation functions has reached the predetermined number of trials. The output device 200 displays the characteristic diagram having the time response curves of the position errors related to the weighting factors W1, W2, and W3 in the section P3 of the display screen P when machine learning of all evaluation functions of the weighting factors W1, W2, and W3 ends.

By doing so, the following characteristics are understood from the time response curves of the weighting factors W1, W2, and W3 displayed in the section P3 of the display screen P, for example. Referring to FIG. 3, it is understood that the time response curve of the position error related to the weighting factor W1 has a low-frequency position error suppressed as compared to the time response curves of the position errors related to the weighting factors W2 and W3, and a position error area of the characteristic diagram is the smallest among the time response curves of the position errors related to the weighting factors W1 to W3. On the other hand, it is understood that high-frequency vibration of the position error remains. Moreover, it is understood that the time response curve of the position error related to the weighting factor W2 has a high-frequency position error suppressed as compared to the time response curves of the position errors related to the weighting factors W1 and W3 and a position error area of the characteristic diagram is the largest among the time response curves of the position errors related to the weighting factors W1 to W3. On the other hand, it is understood that the curve is smooth and shock is best suppressed. Moreover, it is understood that the time response curve of the position error related to the weighting factor W3 has a mid-frequency position error suppressed as compared to the time response curves of the position errors related to the weighting factors W1 and W2, and the curve is smooth and shock is reduced as compared to the time response curve of the position error related to the weighting factor W1. On the other hand, it is understood that the position error area increases a little.

In this manner, a user can select a weighting factor of evaluation function by looking at the time responses of the position errors corresponding to a plurality of evaluation functions. The operation of the user selecting any one of the weighting factors W1 to W3 is similar to an operation of selecting any one of the weighting factors W1 to W3 in order to display the characteristic diagram except that "determine" in the section P3 of the display screen P is selected. That is, in a case in which the weighting factor W1, for example, is selected, when the user selects the column of the weighting factor W1 in the table of the section P3 of the display screen P, the control unit 205 indicates the column of the weighting factor W1 by a bold rectangle. When the user selects "determine" in the section P3 of the display screen P, the control unit 205 transmits the parameters of the velocity feedforward processing unit obtained by performing machine learning with the evaluation function of Expression 2 of the weighting factor W1 of the weighting factors coefficients $\alpha=1$, $\beta=0$, and $\gamma=0$. By doing so, it is possible to obtain servo characteristics (a time response or the like of a position error) intended by the user when the servo control device 300 subsequently performs servo control in the velocity feedforward processing unit using the parameters. Moreover, the control unit 205 transmits the identification information of the evaluation function of the weighting factor W1 to the machine learning device 100. When the machine learning device 100 sets the evaluation function to the evaluation function of the weighting factor W1, the machine learning device 100 can use the evaluation function of the weighting factor W1 when executing relearning, for example.

[Relearning with Changed Weighting Coefficient]

A process when a user changes the weighting factor values to weighting factor values other than the three different weighting factor values displayed in the section P3 of the display screen P illustrated in FIG. 3 to perform relearning will be described. When the user selects the column of the weighting factor W1 in the table of the section P3 of the display screen P, the control unit 205 indicates the column of the weighting factor W1 by a bold rectangle so that the weighting coefficients $\alpha$, $\beta$, and $\gamma$ in the column can be edited. When the user selects $\alpha=1$, $\beta=0.1$, and $\gamma=0.2$, for example, and selects "select" in the section P3 of the display screen P, the control unit 205 transmits evaluation function instruction information (serving as a change instruction) including the identification information of the evaluation function of Expression 2 and the weighting coefficient ($\alpha=1$, $\beta=0.1$, and $\gamma=0.2$) of the weighting factor W1 of the evaluation function to the machine learning device 100 via the learning information output unit 202. The machine learning device 100 changes the evaluation function to the evaluation function of Expression 2 of the weighting coefficient ($\alpha=1$, $\beta=0.1$, and $\gamma=0.2$) on the basis of the evaluation function instruction information and starts machine learning on the basis of the evaluation function. The subsequent processes are similar to the operations for obtaining the characteristic diagram having the time response curve of the weighting factor W1, and the description thereof will be omitted. In this way, the machine learning device 100 performs relearning.

Specific Example 2: Example of Plurality of Evaluation Functions Having Different Weighting Factors and Types In Specific Example 1, an example in which an evaluation function is selected or a weighting coefficient is corrected from a plurality of evaluation functions set by a plurality of weighting coefficients is selected has been described. In Specific Example 2, an example in which an evaluation function is selected from two evaluation functions having different weighting factors and types will be described. In Specific Example 2, an operation when the output device 200 displays a screen showing the evaluation function of Expression 2 and a diagram showing a time response of a position error acquired on the basis of the parameters learned with the evaluation function and a screen showing the evaluation function of Expression 3 and a diagram showing a time response of a position error acquired on the basis of the parameters learned with the evaluation function in parallel will be described with reference to FIG. 4.

Figure 4:
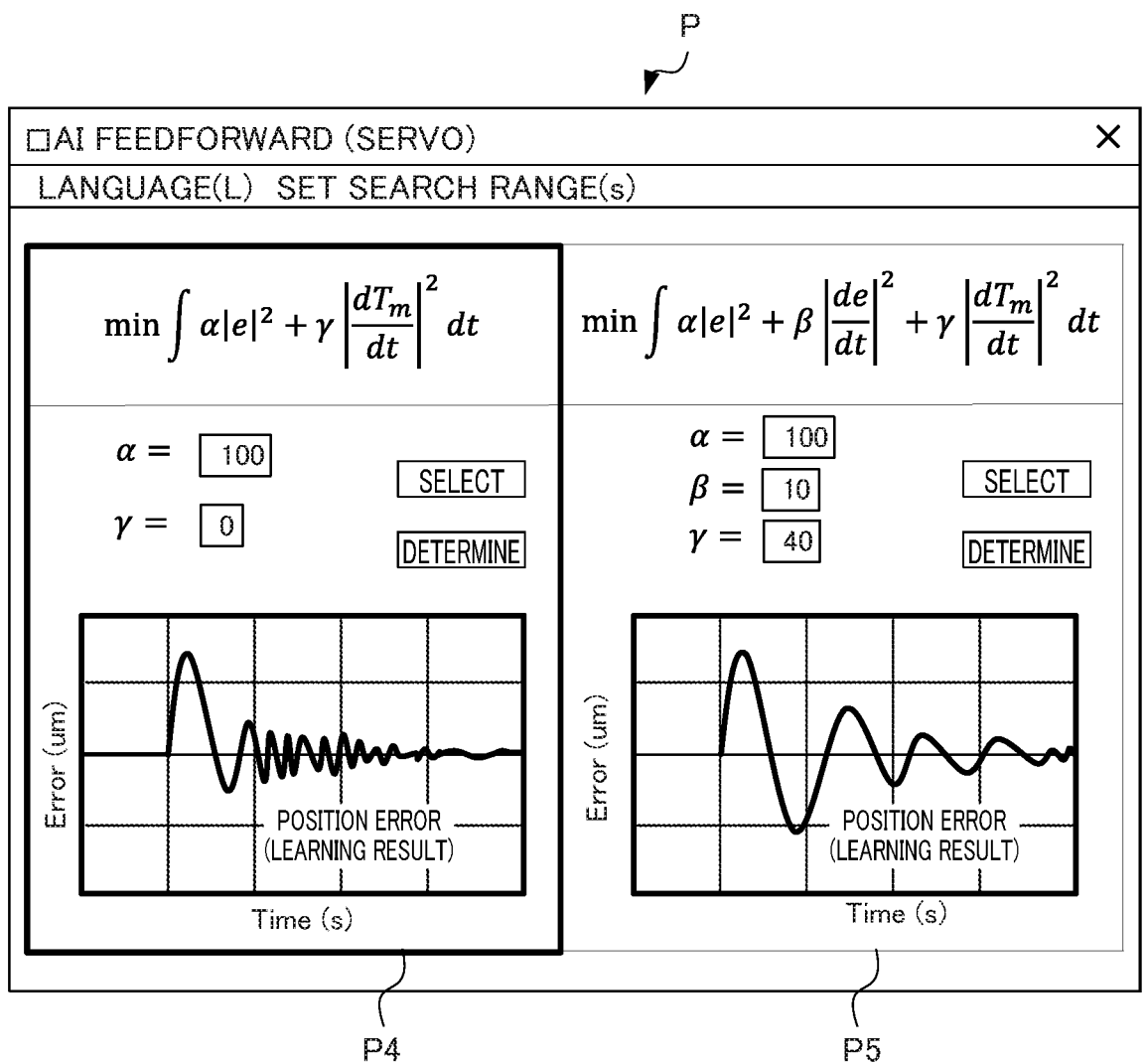
FIG. 4 is a diagram illustrating an example of a display screen displaying screens showing a plurality of evaluation functions and a graph indicating a time response of position errors based on parameters learned with these evaluation functions in parallel.
Figure 5:
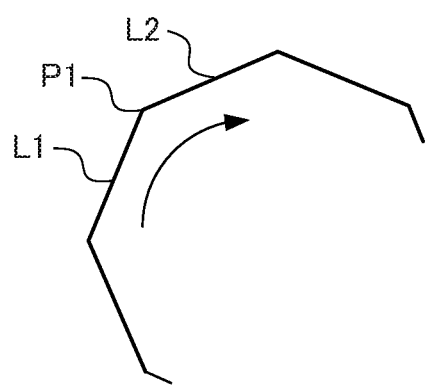
FIG. 5 is a diagram illustrating a portion of a machining trajectory when a machining shape of a workpiece is an octagon.

In the present embodiment, a servo control device is driven using a learning machining program in which a machining shape of a workpiece is as illustrated in FIG. 5. When a workpiece is to be machined in the machining shape illustrated in FIG. 5, a servo motor and a servo control device that drive a table in the X-axis direction and a servo motor and a servo control device that drive the table in the Y-axis direction are necessary. In the present embodiment, the machine learning device 100 machine-learns the coefficients of the velocity feedforward processing unit of the servo control device for driving the table in the Y-axis direction, and the output device 200 displays two evaluation functions to be used for the machine learning and a diagram showing a time response of a position error acquired on the basis of the parameters learned with the respective evaluation functions as illustrated in FIG. 4. In FIG. 5, the servo motor that drives the table in the Y-axis direction rotates at a constant velocity in a linear portion L1, the velocity is reduced at a point P1, and the servo motor rotates at the constant reduced velocity in a linear portion L2. FIG. 4 is a diagram illustrating an example of a display screen when displaying a screen showing the evaluation function of Expression 2 and a diagram showing a time response of a position error acquired on the basis of the parameters learned with the evaluation function and a screen showing the evaluation function of Expression 3 and a diagram showing a time response of a position error acquired on the basis of the parameters learned with the evaluation function in parallel.

As illustrated in FIG. 4, the display screen P includes a section P4 and a section P5. The control unit 205 displays a diagram showing the evaluation function of Expression 3, the weighting coefficients $\alpha$ and $\gamma$ of the evaluation function, and a time response of a position error acquired on the basis of the parameters learned with the evaluation function in the section P4. Moreover, the control unit 205 displays a diagram showing the evaluation function of Expression 2, the weighting coefficients $\alpha$, $\beta$, and $\gamma$ of the evaluation function, and a time response of a position error acquired on the basis of the parameters learned with the evaluation function in the section P5. A diagram showing a time response of a position error is not displayed in the sections P4 and P5 before learning is performed.

When a user such as an operator selects a frame of the section P4 of the display screen P illustrated in FIG. 4 using the operating unit 204, the control unit 205 indicates the frame of the section P4 by a bold rectangle so that the weighting coefficients $\alpha$ and $\gamma$ in the section P4 can be edited. The user inputs $\alpha=100$ and $\gamma=0$, for example, and selects "select" in the section P4 of the display screen P. Although the weighting coefficients $\alpha$ and $\gamma$ are input by the user, the weighting coefficients may be set in advance.

After that, similarly to Specific Example 1, the control unit 205 transmits evaluation function instruction information including the identification information of the evaluation function of Expression 3 and the weighting coefficient ($\alpha=100$ and $\gamma=0$) of the weighting factor W1 of the evaluation function to the machine learning device 100 via the learning information output unit 202. The machine learning device 100 performs machine learning using the evaluation function of Expression 3 of the weighting coefficients ($\alpha=100$ and $\gamma=0$).

The servo control device 300 changes the coefficients of the transfer function of the velocity feedforward processing unit on the basis of the correction parameters output from the machine learning device 100 during machine learning to drive the servo motor 400. Moreover, the output device 200 acquires servo information including a control command such as a position command, a velocity command, and a torque command and a position error, a velocity error, and the like based on the correction parameters from the servo control device 300, outputs the same to the machine learning device 100, and stores the position error, the velocity error, and the like in the storage unit 206. Whenever the learning (trial) is performed, the machine learning device 100 stores the coefficients (parameters) of the transfer function and the servo information and the learning result (a time response or a frequency response of the position error) obtained by operating the servo control device 300 using the parameters in a storage unit (not illustrated).

When the machine learning device 100 performs learning by a predetermined number of trials, the output device 200 performs processes similar to those of Specific Example 1 and displays the evaluation function of Expression 3, the weighting coefficients $\alpha$ and $\gamma$ of the evaluation function, and a diagram showing a time response of a position error acquired with the parameters learned on the basis of the evaluation function in the section P4 of the display screen P illustrated in FIG. 4.

Subsequently, when a user selects the frame of the section P5 of the display screen P illustrated in FIG. 4 using the operating unit 204, the control unit 205 indicates the frame of the section P5 by a bold rectangle so that the weighting coefficients $\alpha$, $\beta$, and $\gamma$ in the section P5 can be edited. The user inputs $\alpha=100$, $\beta=10$, and $\gamma=40$, for example, and selects "select" in the section P5 of the display screen P. Although the weighting coefficients $\alpha$, $\beta$, and $\gamma$ are input by the user, the weighting coefficients may be set in advance.

The subsequent operations of the output device 200 and the machine learning device 100 are similar to the above-described operations of displaying information such as the evaluation function of Expression 3, the weighting coefficients $\alpha$ and $\gamma$ of the evaluation function, and the diagram showing the time response of the position error in the section P4 of the display screen P except that the evaluation function of Expression 2, the weighting coefficients $\alpha$, $\beta$, and $\gamma$ of the evaluation function, and a diagram showing a time response of a position error acquired with the parameters learned on the basis of the evaluation function are displayed in the section P5 of the display screen P illustrated in FIG. 4.

Figure 6A:
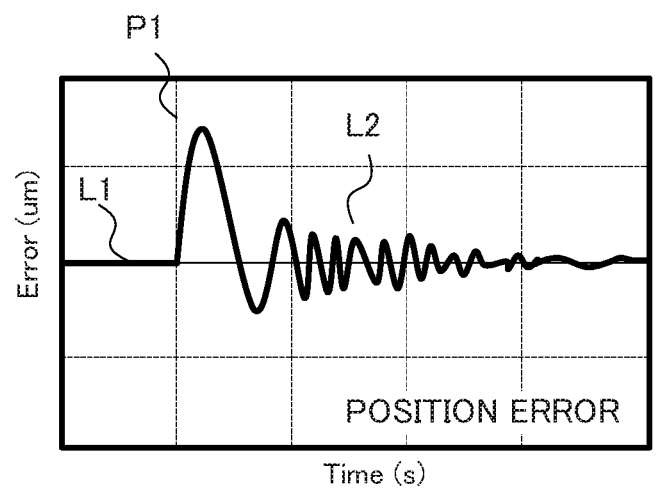
FIG. 6A is a diagram illustrating an example of a characteristic diagram illustrating a relation between a machining trajectory and a time response of a position error.
Figure 6B:
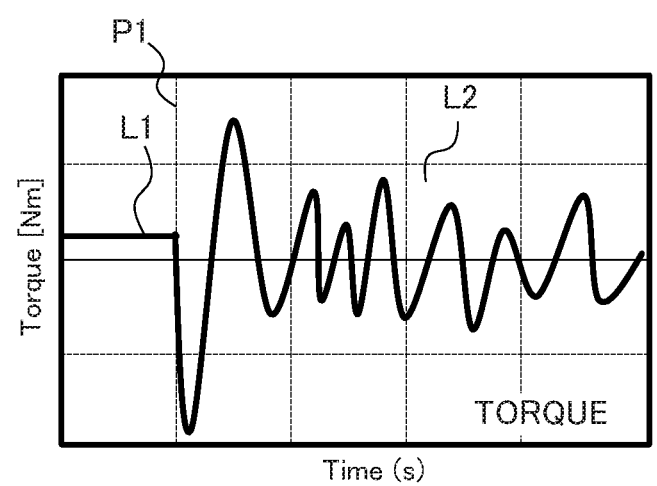
FIG. 6B is a diagram illustrating an example of a time response characteristic diagram of a machining trajectory and a time response of a torque.

A time response curve of the position error displayed in the section P4 of the display screen P in FIG. 4 will be described with reference to FIG. 5 and FIGS. 6A and 6B. FIGS. 6A and 6B illustrate a time response characteristic of a position error and a time response characteristic of a torque illustrated in the section P4 of the display screen P in FIG. 4. L1, P1, and L2 illustrated in FIGS. 6A and 6B correspond to the linear portion L1, the point P1, and the linear portion L2 in FIG. 5, respectively. Since the weighting coefficients of the evaluation function of Expression 3 illustrated in the section P4 of the display screen P are $\alpha=100$ and $\gamma=0$, a strong weighting factor is applied to a position error, and a large position error occurring in the point P1 of FIG. 5 is attenuated quickly in the linear portion L2 as illustrated in FIG. 6A. However, as illustrated in FIG. 6B, since there are cases where a torque is increased or decreased abruptly in the linear portion L2, a high-frequency vibration remains in the position error. On the other hand, since the weighting coefficients of the evaluation function of Expression 2 illustrated in the section P5 of the display screen P are $\alpha=100$, $\beta=10$, and $\gamma=40$, a weighting factor is applied to a torque differential value, the torque becomes smooth in the linear portion L2 as illustrated in FIG. 7B, and a high-frequency signal of the position error decreases in the linear portion L2 as illustrated in FIG. 7A, but a time convergence of a position error becomes gentle.

The user can select the type of an evaluation function and a weighting factor by looking at the time responses of the position errors corresponding to the two evaluation functions. An operation of the user selecting the evaluation function type and the weighting factor from the evaluation functions illustrated in FIG. 4 is similar to the selection operation illustrated in Specific Example 1. That is, in a case where a user selects the evaluation function of Expression 3, for example, when the user selects the frame of the section P4 of the display screen P using the operating unit 204, the control unit 205 indicates the frame of the section P4 by a bold rectangle. When the user selects "determine" in the section P4 of the display screen P, the evaluation function of Expression 3 is selected. In a case where the user changes the weighting coefficients $\alpha=100$ and $\gamma=0$, after the weighting coefficients are changed, the user selects "determine" in the section P4 of the display screen P.

When the user selects "determine" in the section P4 of the display screen P, the control unit 205 transmits the parameters of the velocity feedforward processing unit obtained by performing machine learning on the basis of the evaluation function of Expression 3 of the weighting coefficients $\alpha=100$ and $\gamma=0$ to the servo control device 300. It is possible to obtain servo characteristics (a time response or the like of a position error) intended by the user when the servo control device 300 performs servo control in the velocity feedforward processing unit set to the parameters.

When the user selects "determine" in the section P4 of the display screen P, the control unit 205 transmits the weighting coefficients $\alpha=100$ and $\gamma=0$ and the identification information of the evaluation function of Expression 3 to the machine learning device 100. When the machine learning device 100 sets the evaluation function to the evaluation function of Expression 3 of the weighting coefficients $\alpha=100$ and $\gamma=0$, and when the user wants to execute machine learning in the machine learning device 100 subsequently, the machine learning device 100 can perform machine learning with the evaluation function of Expression 3 of the weighting coefficients $\alpha=100$ and $\gamma=0$.

[Relearning]

A user may want to change the weighting factor of an evaluation function to perform relearning by looking at the time responses of the position errors corresponding to the evaluation functions of the weighting coefficients in the sections P4 and P5 of the display screen P. In a case where a user changes the weighting factor of an evaluation function to perform relearning the time response of the position error corresponding to the evaluation function of the weighting coefficients in the section P4 of the display screen P, for example, when the user selects the frame of the table in the section P4 of the display screen P, the control unit 205 indicates the frame by a bold rectangle so that the weighting coefficients $\alpha$ and $\gamma$ in the frame can be edited. When the user inputs $\alpha=100$ and $\gamma=20$, for example, and selects "select" in the section P4 of the display screen P, the control unit 205 transmits evaluation function instruction information (a change instruction) including the identification information of the evaluation function of Expression 3 and the weighting coefficients ($\alpha=100$ and $\gamma=20$) of the evaluation function to the machine learning device 100 via the learning information output unit 202. The machine learning device 100 changes the evaluation function to the evaluation function of Expression 3 of the weighting coefficients ($\alpha=100$ and $\gamma=20$) on the basis of the evaluation function instruction information, performs machine learning on the basis of the evaluation function to finely adjust the coefficients of the transfer function of the velocity feedforward processing unit so that the coefficients (parameters) of the transfer function of the velocity feedforward processing unit approach optimal values to obtain correction parameters, and transmits the correction parameters and the number of trials to the output device 200. The control unit 205 outputs the correction parameters to the servo control device 300. In this way, the machine learning device 100 performs relearning.

Figure 8:
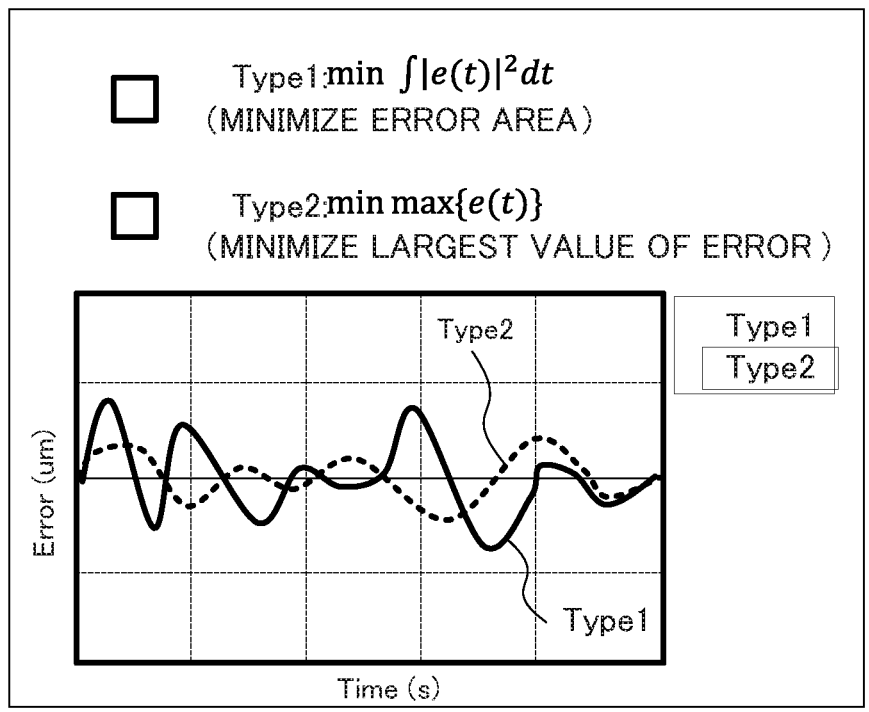
FIG. 8 is a diagram illustrating an example of a display screen displaying a graph obtained by superimposing time response curves of position errors acquired on the basis of parameters learned with a plurality of evaluation functions.

Specific Example 3: Example of Plurality of Evaluation Functions of Different Types In Specific Example 2, an example of selecting either one of two evaluation functions having different weighting factors and types has been described. In Specific Example 3, either one of an evaluation function of Expression 5 that minimizes the square of the absolute value of a position error and an evaluation function of Expression 6 that minimizes the largest value of position errors is selected using the evaluation functions of Expressions 5 and 6. FIG. 8 is a diagram illustrating an example of a display screen when displaying the evaluation function (Type 1) of Expression 5 and the evaluation function (Type 2) of Expression 6 and a diagram showing the time response curves of the position errors acquired on the basis of the parameters learned with each of the evaluation functions in a superimposed manner. The evaluation function is selected in such a way that, when a user enters a checkmark in a rectangle illustrated in FIG. 8 using the operating unit 204, the control unit 205 determines that the evaluation function corresponding to the checkmark is selected. The operations of the machine learning device 100, the output device 200, and the servo control device 300 are similar to those of Specific Example 1, and the description thereof will be omitted.

Figure 9:
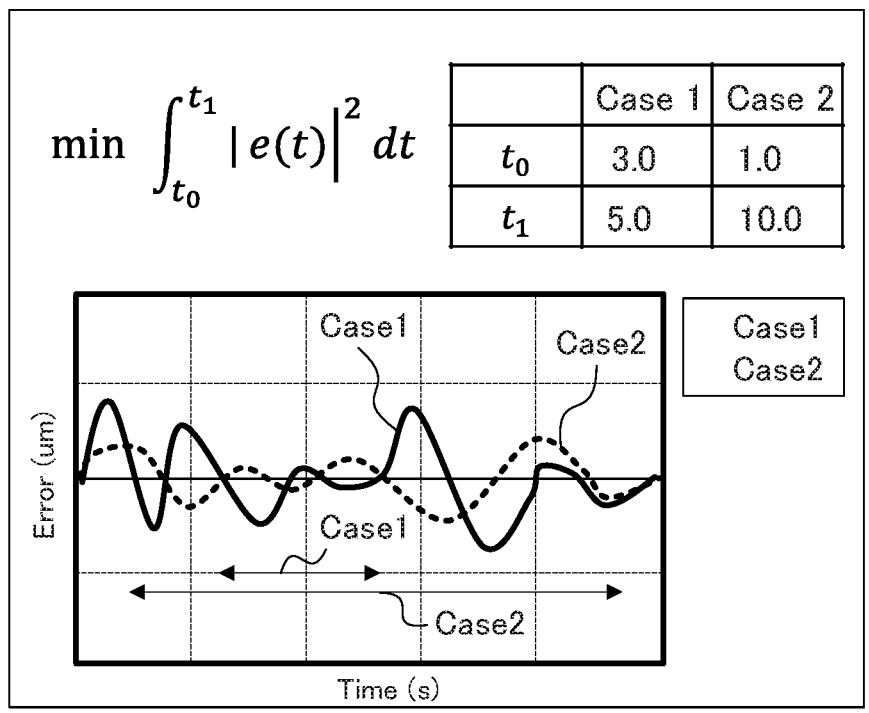
FIG. 9 is a diagram illustrating an example of a display screen displaying a graph obtained by superimposing time response curves of position errors acquired on the basis of parameters learned with a plurality of evaluation functions.

Specific Example 4: Example of Plurality of Evaluation Functions Having Different Integration Time Ranges In Specific Example 2, an example of selecting either one of two evaluation functions having different weighting factors and types has been described. In Specific Example 4, an evaluation function is selected from a plurality of evaluation functions in which a time range (a range of t0 to t1) of a set of squares of the absolute value of the position error is changed using the evaluation function of Expression 4. FIG. 9 is a diagram illustrating an example of a display screen when displaying the evaluation function of Expression 4, a table indicating the time range t0 and t1 (Case 1 and Case 2) of the evaluation function, and a diagram showing the time response curves of the position errors acquired on the basis of the parameters learned with the evaluation functions in a superimposed manner. The operations of the machine learning device 100, the output device 200, and the servo control device 300 are similar to those of Specific Example 1, and the description thereof will be omitted.

Specific Example 5

Although Specific Examples 1 to 4 describe an example of displaying a time response characteristic of a position error on the display screen P, a frequency response characteristic of a position error may be displayed instead of or together with the time response characteristic of the position error.

Figure 10A:
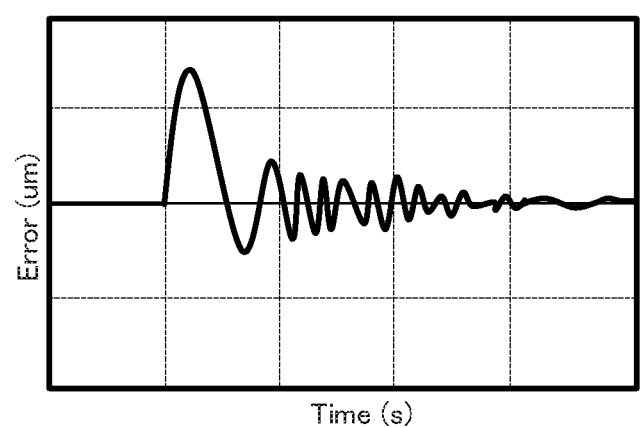
FIG. 10A is a diagram illustrating an example of a time response characteristic diagram of a position error.
Figure 10B:
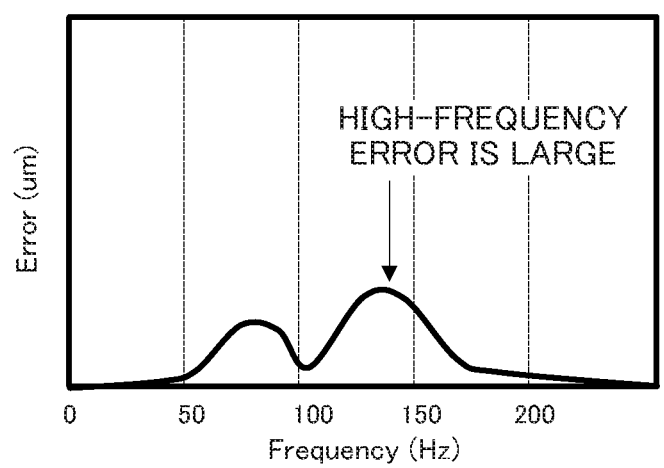
FIG. 10B is a diagram illustrating an example of a frequency response diagram of a position error.
Figure 11A:
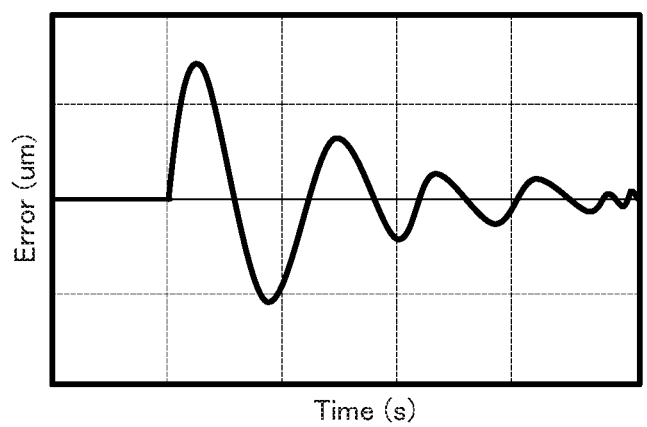
FIG. 11A is a diagram illustrating an example of a time response characteristic diagram of a position error.
Figure 11B:
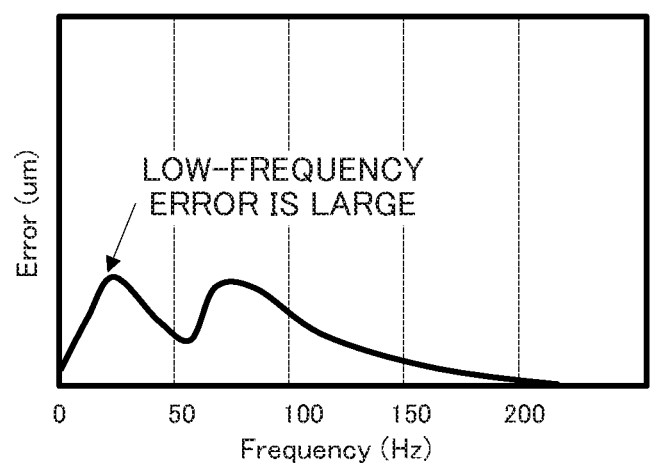
FIG. 11B is a diagram illustrating an example of a frequency response diagram of a position error.
Figure 12:
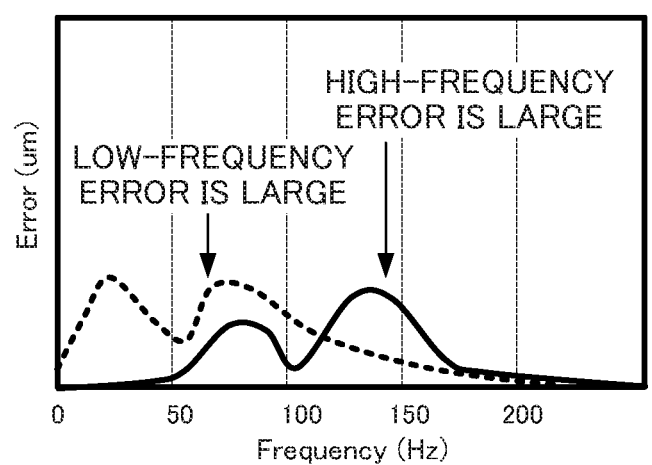
FIG. 12 is a diagram illustrating an example of a graph obtained by superimposing a plurality of frequency characteristic curves.

FIGS. 10B and 11B illustrate a frequency response characteristic diagram displayed instead of a time response characteristic diagram of FIG. 10A corresponding to the characteristic diagram in the section P4 of FIG. 4 and a time response characteristic diagram of FIG. 11A corresponding to the characteristic diagram in the section P5. FIG. 10B is a frequency characteristic diagram of a position error acquired from the servo control device 300 when the machine learning device 100 performs learning using the evaluation function of Expression 3, and FIG. 11B is a frequency characteristic diagram of a position error acquired from the servo control device 300 when the machine learning device 100 performs learning using the evaluation function of Expression 2. The frequency characteristic diagram illustrated in FIG. 10B shows that a high-frequency error is large and has peaks around 80 Hz and 140 Hz. The frequency characteristic diagram illustrated in FIG. 11B shows that a low-frequency error is large and has peaks around 25 Hz and 75 Hz. Moreover, the frequency characteristic curve illustrated in FIG. 10B may be displayed to be superimposed on the frequency characteristic curve illustrated in FIG. 11B. FIG. 12 is a diagram showing the frequency characteristic curve illustrated in FIG. 10B and the frequency characteristic curve illustrated in FIG. 11B so as to be superimposed on each other.

While examples of the display screen to be displayed on the display screen P of the display unit 209 have been described, the display screens illustrated in Specific Examples 1 to 5 or the characteristic diagrams displayed in the display screen are examples, and the present embodiment is not limited thereto. Information other than the illustrated items may be also displayed. Moreover, the displayed information of any one of the illustrated items may be omitted. Moreover, in the above description, although the control unit 205 stores the position error acquired from the servo control device 300 in the storage unit 206 and displays the evaluation function and the diagram or the like indicating the time response of the position error on the display unit 209 when the number of trials of the machine learning device 100 has reached the predetermined number of trials, the present invention is not limited thereto. For example, the following examples may be adopted as a configuration example in which the information is displayed regardless of the number of trials. Configuration Example 1: An evaluation function and a diagram or the like indicating a time response of a position error are displayed when a user such as an operator issues a display instruction. Configuration Example 2: An evaluation function and a diagram or the like indicating a time response of a position error are displayed when machine learning is suspended.

Figure 13:
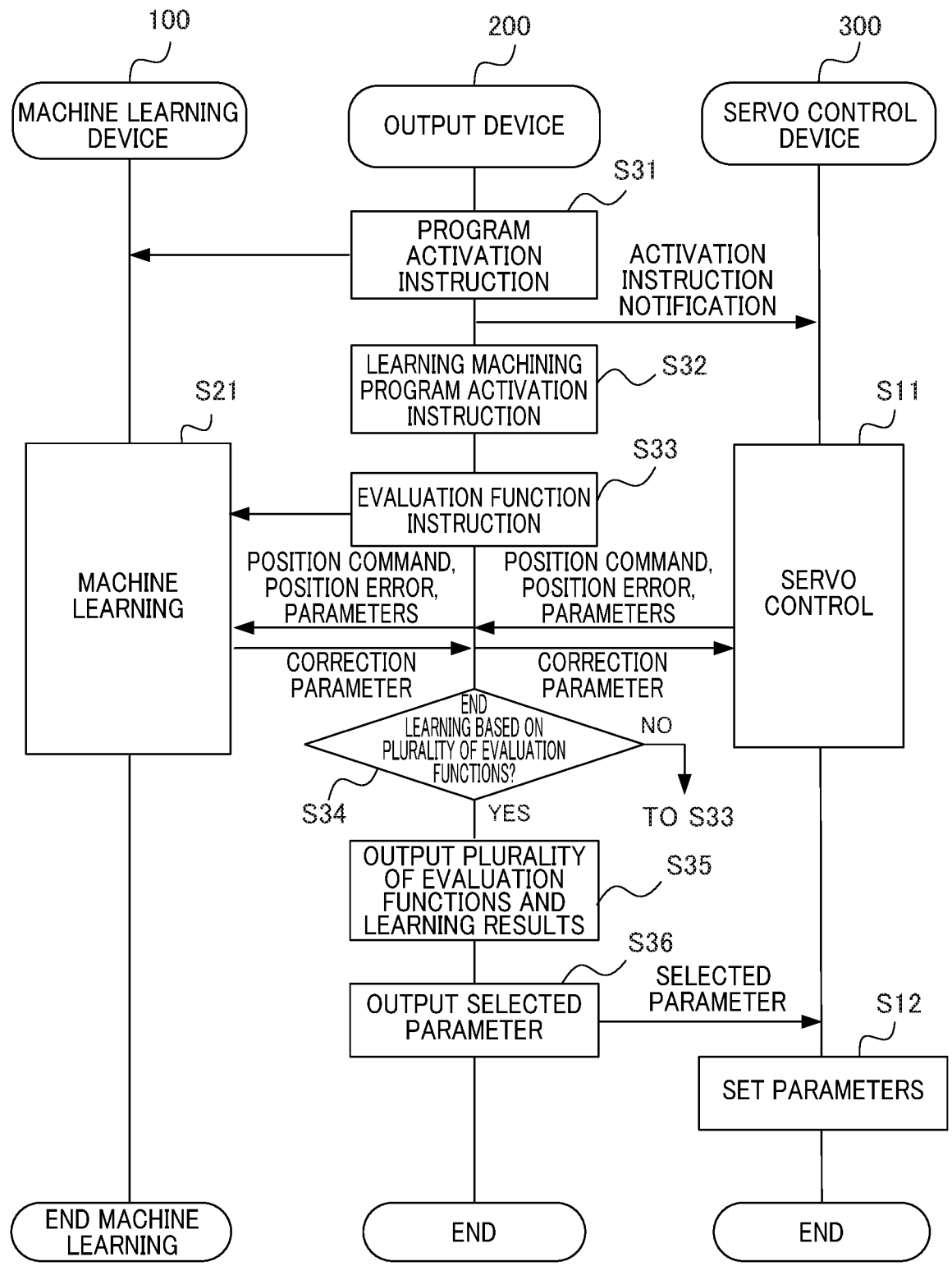
FIG. 13 is a flowchart illustrating an operation of a control device, mainly of an output device, from the start of machine learning to the end of machine learning.

Next, an operation of the output device 200 will be described with reference to FIG. 13. FIG. 13 is a flowchart illustrating an operation of a control device, mainly of an output device, from the start of machine learning to the end of machine learning. In step S31, when a user selects "activate program" in the section P1 of the display screen P of the display unit 209 illustrated in FIG. 3, for example, with the aid of the operating unit 204 such as a mouse or a keyboard, the control unit 205 (the output device 200) outputs a program activation instruction to the machine learning device 100 via the learning information output unit 202. Moreover, the output device 200 outputs a learning program activation instruction notification to the servo control device 300 informing that a learning program activation instruction has been output to the machine learning device 100. In step S32, the output device 200 issues a learning machining program activation instruction to a host device that outputs a learning machining program to the servo control device 300. Step S32 may be performed before step S31 or simultaneously with step S31. Upon receiving the learning machining program activation instruction, the host device creates a position command and outputs the position command to the servo control device 300. In step S33, the output device 200 transmits evaluation function instruction information including a weighting coefficient value of an evaluation function and the identification information of the evaluation function to be used to the machine learning device 100. In step S21, upon receiving the program activation instruction, the machine learning device 100 starts machine learning. Upon receiving the evaluation function instruction information from the output device 200, the machine learning device 100 sets an evaluation function with which machine learning is performed on the basis of the evaluation function of the instructed weighting coefficient and type.

In step S11, the servo control device 300 controls the servo motor 400 to output the servo information including the parameters (the coefficients $a_i$ and $b_j$) of the velocity feedforward processing unit 308, the position command, and the position error to the output device 200. The output device 200 outputs the parameters, the position command, and the position error to the machine learning device 100.

In step S21, the machine learning device 100 outputs information including an evaluation function value, a largest number of trials, the number of trials, and the correction information (correction parameters) of the coefficients $a_i$ and $b_j$ of the transfer function of the velocity feedforward processing unit 308, related to the state S associated with the number of trials used by the reward output unit 2021 during the machine learning operation performed using the set evaluation function to the output device 200. The output device 200 outputs the correction information of the coefficients $a_i$ and $b_j$ of the transfer function of the velocity feedforward processing unit 308 to the servo control device 300. Steps S11 and S21 are performed repeatedly up to the predetermined number of trials.

In step S34, the output device 200 determines whether a machine learning operation with the plurality of evaluation functions designated by the user has ended when the number of trials reaches the predetermined number of trials and the machine learning with the set evaluation function ends. When it is determined that the learning operation with the plurality of evaluation functions has ended, the output device 200 displays the plurality of evaluation functions and the learning results (for example, time responses of position errors) machine-learned with the respective evaluation functions on the display screen P of the display unit 209 in step S35. When it is determined that the learning operation with the plurality of evaluation functions has not ended, the flow returns to step S33, and the output device 200 outputs an evaluation function instruction for the next evaluation function to the machine learning device 100. In step S36, when the user selects an evaluation function, the output device 200 transmits the coefficients $a_i$ and $b_j$ of the transfer function of the velocity feedforward processing unit 308, optimized by the machine learning using the selected evaluation function to the servo control device 300. In step S12, the servo control device 300 sets the optimized coefficients $a_i$ and $b_j$ as the coefficients (parameters) of the transfer function of the velocity feedforward processing unit 308.

Next, the servo control device 300 will be described.

<Servo Control Device 300>

Figure 14:
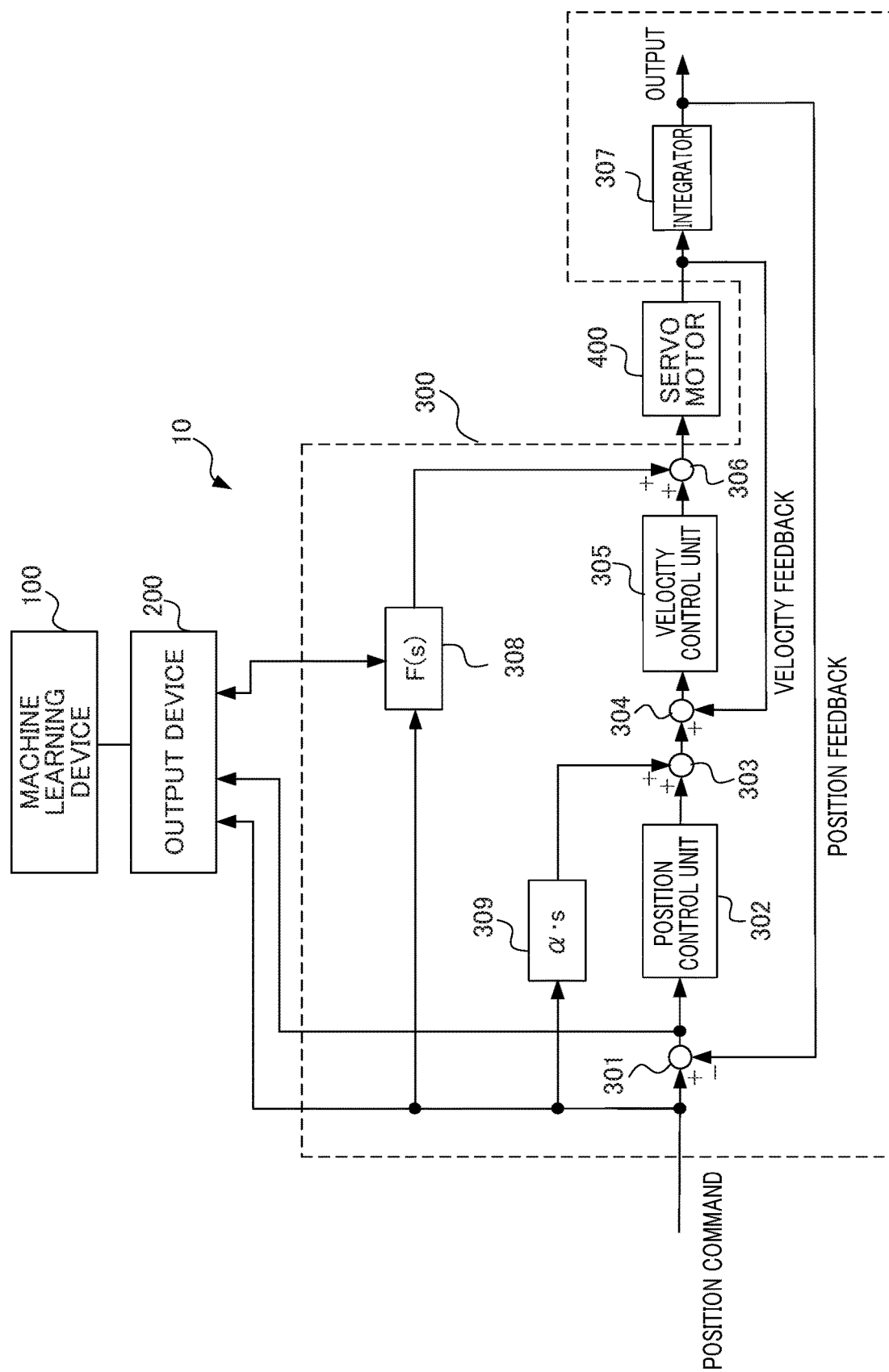
FIG. 14 is a block diagram illustrating a configuration example of a servo control device included in the control device according to the first embodiment of the present invention.

FIG. 14 is a block diagram illustrating a configuration example of a servo control device included in the control device according to the first embodiment of the present invention. As illustrated in FIG. 14, the servo control device 300 includes, as its components, a subtractor 301, a position control unit 302, an adder 303, a subtractor 304, a velocity control unit 305, an adder 306, an integrator 307, a velocity feedforward processing unit 308, and a position feedforward processing unit 309.

A position command is output to the subtractor 301, the velocity feedforward processing unit 308, the position feedforward processing unit 309, and the output device 200. The position command is created by a host device on the basis of a program that operates the servo motor 400. The servo motor 400 is included in a machine tool, for example. In a machine tool, when a table having a workpiece (a work) mounted thereon moves in an X-axis direction and a Y-axis direction, the servo control device 300 and the servo motor 400 illustrated in FIG. 14 are provided in the X-axis direction and the Y-axis direction, respectively. When the table is moved in directions of three or more axes, the servo control device 300 and the servo motor 400 are provided in the respective axis directions. A feed rate and a position command are set so that a machining shape designated by a machining program is obtained.

The subtractor 301 obtains a difference between a position command value and a position-feedback detection position and outputs the difference to the position control unit 302 and the output device 200 as a position error. The position control unit 302 outputs a value obtained by multiplying the position error by a position gain Kp to the adder 303 as a velocity command value. The adder 303 adds the velocity command value and an output value (a position feedforward term) of the position feedforward processing unit 309 and outputs an addition result to the subtractor 304 as a feedforward-controlled velocity command value. The subtractor 304 obtains a difference between the output of the adder 303 and the feedback velocity detection value and outputs the difference to the velocity control unit 305 as a velocity error.

The velocity control unit 305 adds a value obtained by multiplying and integrating the velocity error by an integral gain K1v and a value obtained by multiplying the velocity error by a proportional gain K2v and outputs an addition result to the adder 306 as a torque command value. The adder 306 adds the torque command value and an output value (a velocity feedforward term) of the velocity feedforward processing unit 308 and outputs an addition value to the servo motor 400 via a current control unit (not illustrated) as a feedforward-controlled torque command value to drive the servo motor 400.

A rotational angular position of the servo motor 400 is detected by a rotary encoder serving as a position detection unit, associated with the servo motor 400, and the velocity detection value is input to the subtractor 304 as a velocity feedback. The velocity detection value is integrated by the integrator 307 to be a position detection value, and the position detection value is input to the subtractor 301 as a position feedback.

The velocity feedforward processing unit 308 performs a velocity feedforward process with respect to the position command and outputs a processing result to the adder 306 as a velocity feedforward term. The transfer function of the velocity feedforward processing unit 308 is a transfer function F(s) represented by Expression 1 described above.

The velocity feedforward processing unit 308 may be represented by an inverse characteristic (a transfer function is $Js^2$) of the motor and a notch filter. When the velocity feedforward processing unit 308 is represented by an inverse characteristic (a transfer function is $Js^2$) of the motor and a notch filter, the transfer function F(s) represented by Expression 1 is a numerical expression model in the right side of Expression 7 and is represented similarly to the right side of Expression 7 using the inertia J, the central angular frequency ω, the specific bandwidth ζ, and the attenuation coefficient R.

$$\frac{b_2 s^2 + b_3 s^3 + b_4 s^4}{a_0 + a_1 s + a_2 s^2} = Js^2 \cdot \frac{\omega^2 + 2R\zeta\omega s + s^2}{\omega^2 + 2\zeta\omega s + s^2} \qquad \text{[Math. 7]}$$

The position feedforward processing unit 309 differentiates the position command value and multiplying the same by a constant α and outputs a processing result to the adder 303 as a position feedforward term.

The servo control device 300 illustrated in FIG. 14 outputs the position error to the output device 200. However, when the machine learning device 100 uses a velocity error or a torque command in addition to the position error as the evaluation function, the velocity error which is the output of the subtractor 304 or the velocity feedforward-controlled torque command which is the output of the adder 306 is output to the output device 200. The servo control device 300 is configured in this manner. Next, the machine learning device 100 will be described.

<Machine Learning Device 100>

The machine learning device 100 learns the coefficients of the transfer function of the velocity feedforward processing unit 308 by executing a predetermined machining program (hereinafter also referred to as a "learning machining program"). Here, a machining shape designated by the learning machining program is an octagon or a shape in which the corners of an octagon are alternately replaced with arcs, for example. Here, the machining shape designated by the learning machining program is not limited to these machining shapes but may be other machining shapes.

Figure 15:
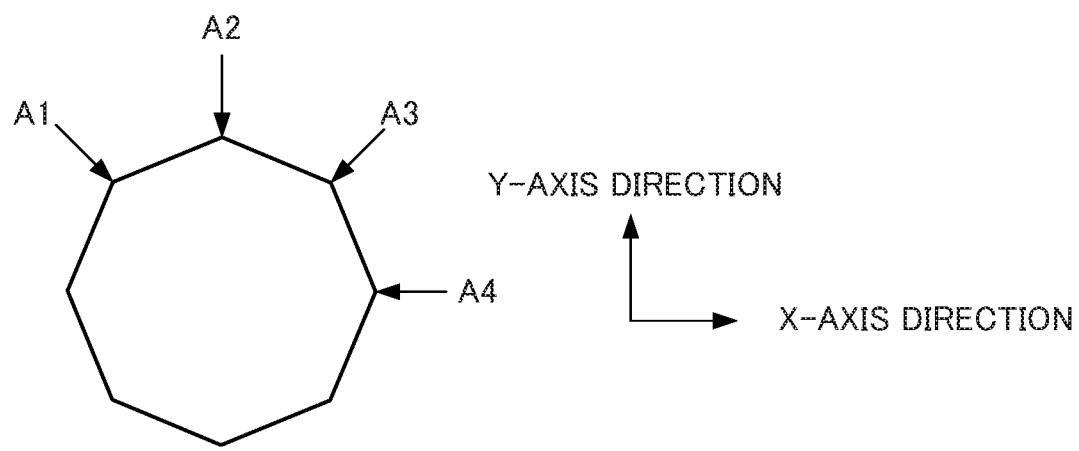
FIG. 15 is a diagram for describing an operation of a motor when a machining shape is an octagon.
Figure 16:
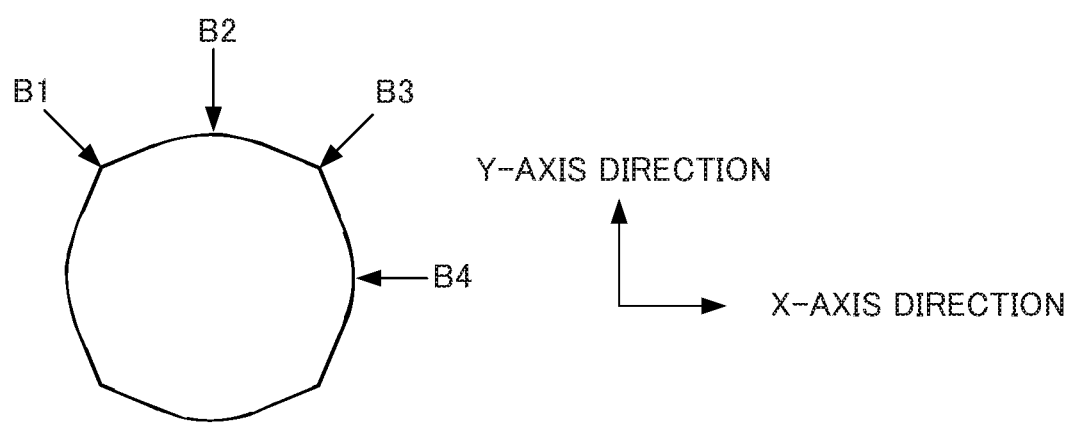
FIG. 16 is a diagram for describing an operation of a motor when a machining shape is a shape in which the corners of an octagon are alternately replaced with arcs.

FIG. 15 is a diagram for describing an operation of a motor when a machining shape is an octagon. FIG. 16 is a diagram for describing an operation of a motor when a machining shape is a shape in which the corners of an octagon are alternately replaced with arcs. In FIGS. 15 and 16, it is assumed that a table is moved in the X and Y-axis directions so that a workpiece (a work) is machined in the clockwise direction.

When the machining shape is an octagon, as illustrated in FIG. 15, the rotation velocity of a motor that moves the table in the Y-axis direction decreases at the corner position A1 whereas the rotation velocity of a motor that moves the table in the X-axis direction increases. A rotation direction of the motor that moves the table in the Y-axis direction is reversed at the corner position A2, and the motor that moves the table in the X-axis direction rotates at an equal velocity in the same rotation direction from the position A1 to the position A2 and from the position A2 to the position A3. The rotation velocity of the motor that moves the table in the Y-axis direction increases at the corner position A3 whereas the rotation velocity of a motor that moves the table in the X-axis direction decreases. A rotation direction of the motor that moves the table in the X-axis direction is reversed at the corner position A4, and the motor that moves the table in the Y-axis direction rotates at an equal velocity in the same rotation direction from the position A3 to the position A4 and from the position A4 to the next corner position.

When the machining shape is a shape in which the corners of an octagon are alternately replaced with arcs, as illustrated in FIG. 16, the rotation velocity of a motor that moves the table in the Y-axis direction decreases at the corner position B1 whereas the rotation velocity of a motor that moves the table in the X-axis direction increases. A rotation direction of the motor that moves the table in the Y-axis direction is reversed at the corner position B2, and the motor that moves the table in the X-axis direction rotates at an equal velocity in the same rotation direction from the position B1 to the position B3. Unlike the case in which the machining shape is an octagon illustrated in FIG. 15, the rotation velocity of the motor that moves the table in the Y-axis direction decreases gradually as it approaches the position B2, the rotation stops at the position B2, and the rotation velocity increases gradually as it departs from the position B2 so that a machining shape of an arc is formed before and after the position B2.

The rotation velocity of the motor that moves the table in the Y-axis direction increases at the corner position B3 whereas the rotation velocity of a motor that moves the table in the X-axis direction decreases. A rotation direction of the motor that moves the table in the X-axis direction is reversed at the corner position B4, and the table moves to be linearly reversed in the X-axis direction. Moreover, the motor that moves the table in the Y-axis direction rotates at an equal velocity in the same rotation direction from the position B3 to the position B4 and from the position B4 to the next corner position. The rotation velocity of the motor that moves the table in the X-axis direction decreases gradually as it approaches the position B4, the rotation stops at the position B4, and the rotation velocity increases gradually as it departs from the position B4 so that a machining shape of an arc is formed before and after the position B4.

In the present embodiment, it is assumed that machine learning related to the optimization of the coefficients of the transfer function of the velocity feedforward processing unit 308 is performed by evaluating vibration when a rotation velocity is changed during linear control at the positions A1 and A3 and the positions B1 and B3 of the machining shape designated by the learning machining program and examining the influence on a position error. Although not used in the present embodiment, coasting (running by inertia) occurring when a rotation direction is reversed at the positions A2 and A4 and the positions B2 and B4 of the machining shape may be evaluated to examine the influence on a position error. The machine learning related to optimization of the coefficients of the transfer function is not particularly limited to a velocity feedforward processing unit but can be applied to a position feedforward processing unit or a current feedforward processing unit provided when performing current feedforward of a servo control device is performed, for example. In this case, the position feedforward processing unit and the current feedforward processing unit have a transfer function (for example, a transfer function similar to the transfer function F(s) represented by Expression 1) having coefficients similarly to the velocity feedforward processing unit.

Hereinafter, the machine learning device 100 will be described in further detail. In the following description, although a case in which the machine learning device 100 performs reinforcement learning is described, the learning performed by the machine learning device 100 is not particularly limited to reinforcement learning, but the present invention can be also applied to a case in which the machine learning device 100 performs supervised learning, for example.

Prior to description of respective functional blocks included in the machine learning device 100, first, a basic mechanism of reinforcement learning will be described. An agent (corresponding to the machine learning device 100 in the present embodiment) observes an environment state and selects a certain action. Then, the environment changes on the basis of the action. A certain reward is given according to the environmental change, and the agent learns selection (decision) for a better action. While supervised learning presents a complete correct answer, the reward in the reinforcement learning often presents a fragmental value based on change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for reducing a position error, is obtained.

Here, although an arbitrary learning method is used as the reinforcement learning, in the description below, Q-learning which is a method of learning a value function Q(S,A) of selecting an action A under a certain environment state S will be described as an example. An object of the Q-learning is to select an action A having the highest value function Q(S,A) as an optimal action among actions A that can be taken in a certain state S.

However, at a time point at which the Q-learning starts initially, the correct value of the value Q(S,A) is not known at all for a combination of the state S and the action A. Therefore, the agent learns the correct value Q(S,A) by selecting various actions A under a certain state S and selecting a better action on the basis of rewards given for the selected actions A.

Since it is desired to maximize the total of rewards obtained in the future, it is aimed to finally attain a relation of $Q(S,A)=E[\Sigma(\gamma^t)r_t]$. Here, E[ ] indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action is optimal in the process of Q-learning, reinforcement learning is performed while searching for an optimal action by performing various actions. An update expression of such a value Q(S,A) can be represented by Expression 8 below (Math. 8).

$$Q(S_{t+1}, A_{t+1}) \leftarrow Q(S_t, A_t) + \alpha\left(r_{t+1} + \gamma\max_A Q(S_{t+1}, A) - Q(S_t, A_t)\right) \quad \text{[Math. 8]}$$

In Expression 8, $S_t$ indicates an environment state at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by γ when an action A having the highest Q value known at that moment was selected under the state $S_{t+1}$. Here, γ is a parameter of 0<γ≤1 and is called a discount rate. Moreover, α is a learning coefficient and is in the range of 0<α≤1.

Expression 8 indicates a method of updating a value $Q(S_t, A_t)$ of an action $A_t$ in a state St on the basis of a returning reward $r_{t+1}$ when the action $A_t$ is performed. This update expression indicates that if the value $\max_a Q(S_{t+1}, A)$ of the best action in the next state St+1 associated with an action $A_t$ is larger than the value $Q(S_t, A_t)$ of an action $A_t$ in the state St, $Q(S_t, A_t)$ is increased, and if otherwise, $Q(S_t, A_t)$ is decreased. That is, the value of a certain action in a certain state approaches the value of the best action in the next state associated with the action. However, although this difference between the values differs depending on the discount rate γ and the reward $r_{t+1}$, the update Expression has such a structure that the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to settle when the values of the value functions Q(S,A) of all state-action pairs are to be calculated since the number of states is too large.

Thus, Q-learning may use an existing technique called a deep Q-network (DQN). Specifically, an agent may calculate the value of the value Q(S,A) by constructing a value function Q using an appropriate neural network and approximating the value function Q with the appropriate neural network by adjusting the parameters of the neural network. By using DQN, it is possible to shorten the time required for settling of Q-learning. The details of DQN are disclosed in Non-Patent Document below, for example.

<Non-Patent Document>

"Human-level control through deep reinforcement learning", Volodymyr Mnihl [online], [searched on Jan. 17, 2017], Internet <URL: http://files.davidqiu.com/research/nature14236.pdf>

The machine learning device 100 performs the above-described Q-learning. The machine learning device 100 learns a value Q of selecting an action A of adjusting the values of the coefficients $a_i$ and $b_j$ of the transfer function of the velocity feedforward processing unit 308, associated with a servo state S such as commands and feedbacks including the values of the coefficients $a_i$ and $b_j$ (0≤i≤m, 0≤j≤n, and m and n are natural numbers) of the transfer function of the velocity feedforward processing unit 308 of the servo control device 300 and the position commands and the position error of the servo control device 300 acquired by executing the learning machining program.

The machine learning device 100 observes the state information S including the servo state such as commands and feedbacks including the position commands and the position error information of the servo control device 300 at the positions A1 and A3 and the positions B1 and B3 of the machining shape by executing the learning machining program on the basis of the coefficients $a_i$ and $b_j$ of the transfer function of the velocity feedforward processing unit 308 to determine the action A. The machine learning device 100 returns a reward whenever the action A is executed. The machine learning device 100 searches for the optimal action A so that a total future reward is maximized by trial-and-error learning. By doing so, the machine learning device 100 can select an optimal action A (that is, the optimal coefficients $a_i$ and $b_j$ of the velocity feedforward processing unit 308) with respect to the state S including the servo state such as commands and feedbacks including the position commands and the position error of the servo control device 300 acquired by executing the learning machining program on the basis of the coefficients $a_i$ and $b_j$ of the transfer function of the velocity feedforward processing unit 308. The rotation direction of the servo motor in the X-axis direction and the Y-axis direction does not change at the positions A1 and A3 and the positions B1 and B3, and the machine learning device 100 can learn the coefficients $a_i$, and $b_j$ of the transfer function of the velocity feedforward processing unit 308 during linear operation.

That is, the machine learning device 100 can select such an action A (that is, the coefficients $a_i$ and $b_j$ of the velocity feedforward processing unit 308) that minimizes the position error acquired by executing the learning machining program by selecting such an action A that maximizes the value of the value function Q among the actions A applied to the coefficients $a_i$ and $b_j$ of the transfer function of the velocity feedforward processing unit 308 related to a certain state S on the basis of the value function Q learned by the machine learning device 100.

Figure 17:
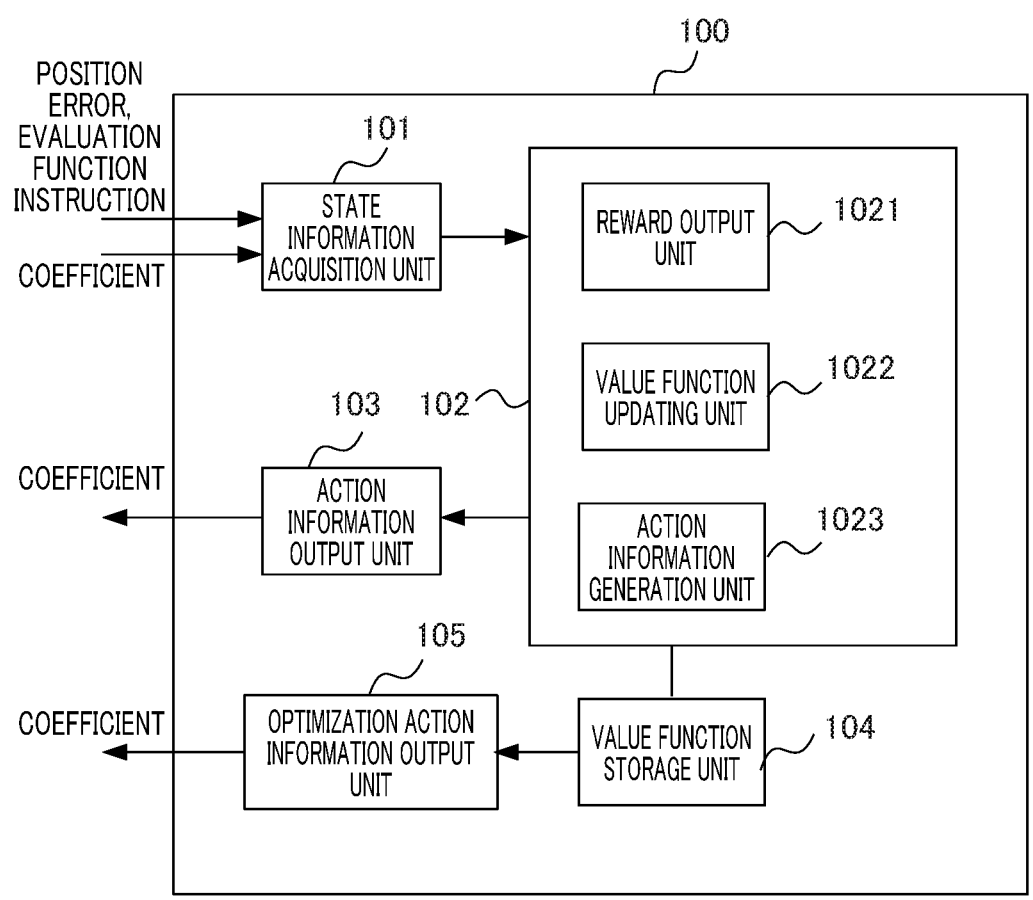
FIG. 17 is a block diagram illustrating a machine learning device according to the first embodiment of the present invention.

FIG. 17 is a block diagram illustrating the machine learning device 100 according to the first embodiment of the present invention. As illustrated in FIG. 17, in order to perform the reinforcement learning described above, the machine learning device 100 includes a state information acquisition unit 101, a learning unit 102, an action information output unit 103, a value function storage unit 104, and an optimization action information output unit 105. The learning unit 102 includes a reward output unit 1021, a value function updating unit 1022, and an action information generation unit 1023.

The state information acquisition unit 101 acquires the state S including the position command and the position error of the servo control device 300 acquired by executing the learning machining program on the basis of the coefficients $a_i$ and $b_j$ of the transfer function of the velocity feedforward processing unit 308 of the servo control device 300 from the servo control device 300 via the output device 200. The state information S corresponds to a state S of the environment in the Q-learning. When the reward output unit 1021 uses a velocity error and a torque command in addition to the position error as the evaluation function, the velocity error and the torque command are acquired from the servo control device 300 via the output device 200. Moreover, the state information acquisition unit 101 acquires instruction information for changing a weighting coefficient of the evaluation function or the type of the evaluation function from the output device 200. The state information acquisition unit 101 outputs the acquired state information S and the instruction information to the learning unit 102.

The coefficients $a_i$ and $b_j$ of the velocity feedforward processing unit 308 at a time point at which the Q-learning starts initially are generated by a user in advance. In the present embodiment, the initial values of the coefficients $a_i$ and $b_j$ of the velocity feedforward processing unit 308 created by the user are adjusted to optimal values by the reinforcement learning. The initial values of the coefficients $a_i$ and $b_j$ of the velocity feedforward processing unit 308 are set such that, for example, in Expression 1, $a_0=1$, $a_1=0$, $a_2=0$, . . . , and $a_m=0$, $b_0=1$, $b_1=0$, $b_2=0$, . . . , and $b_n=0$. The dimensions m and n of the coefficients $a_i$ and $b_j$, are set in advance. That is, 0≤i≤m for $a_i$, and 0≤j≤n for $b_j$. When a machine tool is adjusted by an operator in advance, machine learning may be performed using the adjusted values as the initial values of the coefficients $a_i$ and $b_j$.

The learning unit 102 is a unit that learns the value Q(S,A) when a certain action A is selected under a certain environment state S.

The reward output unit 1021 is a unit that calculates a reward when the action A is selected under a certain state S. Here, a set (a position error set) of position errors which are state variables of the state S will be denoted by PD(S), and a position error set which is state variables related to state information S' which is changed from the state S due to the action information A (corrections of the coefficients $a_i$ and $b_j$ of the velocity feedforward processing unit 308) will be denoted by PD(S'). Moreover, the evaluation function value of the position error in the state S is a value calculated on the basis of a predetermined evaluation function f(PD(S)). The evaluation function at a time point at which the Q-learning starts initially may be generated by a user in advance. For example, the machine learning device 100 stores a plurality of evaluation functions (for example, a plurality of evaluation functions of Expressions 2 to 6) and a user can select an evaluation function from the plurality of stored evaluation functions. Moreover, the user can set the weighting coefficients α, β, and γ. The weighting coefficients α, β, and γ may be set to standard values by a manufacturer of a machine tool at a time point at which the Q-learning starts initially. When identification information is assigned to the plurality of evaluation functions of Expressions 2 to 6, the user selects identification information. As described in Specific Examples 1 to 5, the output device 200 outputs evaluation function instruction information to the machine learning device 100 in order to obtain a time response of a position error and to set to the evaluation function selected by the user and when it is desired to relearn the time response of the position error. The evaluation function instruction information includes identification information of an evaluation function or identification information and a weighting coefficient of an evaluation function. For example, the evaluation function instruction information is acquired by the state information acquisition unit 101, and the state information acquisition unit 101 outputs the evaluation function instruction information to the reward output unit 1021. The reward output unit 1021 sets or changes the weighting coefficient of an evaluation function or the type of the evaluation function on the basis of the evaluation function instruction information. For example, the reward output unit 1021 changes the weighting coefficients α, β, and γ to instructed values upon receiving instruction information to change the weighting coefficients α, β, and γ of the evaluation function f illustrated in Math. 3.

The reward output unit 1021 sets the value of a reward to a negative value when the evaluation function value f(PD (S')) of the position error of the servo control device 300 operated based on the velocity feedforward processing unit 308 after the correction related to the state information S' corrected by the action information A is larger than the evaluation function value f(PD(S)) of the position error of the servo control device 300 operated based on the velocity feedforward processing unit 308 before correction related to the state information S before being corrected by the action information A.

On the other hand, when the evaluation function value f(PD(S')) of the position error becomes smaller than the evaluation function value f(PD(S)) of the position error, the reward output unit 1021 sets the value of the reward to a positive value. When the evaluation function value f(PD(S')) of the position error is equal to the evaluation function value f(PD(S)) of the position error, the reward output unit 1021 may set the value of the reward to zero.

Furthermore, if the evaluation function value f(PD(S')) of the position error in the state S' after execution of the action A becomes larger than the evaluation function value f(PD (S)) of the position error in the previous state S, the negative value may be increased according to the proportion. That is, the negative value may be increased according to the degree of increase in the position error value. In contrast, if the evaluation function value f(PD(S')) of the position error in the state S' after execution of the action A becomes smaller than the evaluation function value f(PD(S)) of the position error in the previous state S, the positive value may be increased according to the proportion. That is, the positive value may be increased according to the degree of decrease in the position error value.

The value function updating unit 1022 updates the value function Q stored in the value function storage unit 104 by performing Q-learning based on the state S, the action A, the state S' when the action A was applied to the state S, and the value of the reward calculated in the abovementioned manner. The updating of the value function Q may be performed by online learning, batch learning, or mini-batch learning. Online learning is a learning method of applying a certain action A to a present state S and updating the value function Q immediately whenever the present state S transitions to a new state S'. Batch learning is a learning method where, by applying a certain action A to a present state S and by repeating the state S transitioning to a new state S', collecting learning data, the value function Q is updated using all the collected learning data. Mini-batch learning is a learning method which is an intermediate between online learning and batch learning and involves updating the value function Q whenever a certain amount of learning data is collected.

The action information generation unit 1023 selects the action A in the process of Q-learning with respect to the present state S. The action information generation unit 1023 generates action information A and outputs the generated action information A to the action information output unit 103 in order to perform an operation (corresponding to the action A of Q-learning) of correcting the coefficients $a_i$ and $b_j$ of the velocity feedforward processing unit 308 of the servo control device 300 in the process of Q-learning. More specifically, the action information generation unit 1023 adds or subtracts the coefficients $a_i$ and $b_j$ of the velocity feedforward processing unit 308 included in the action A incrementally (for example, with a step of approximately 0.01) with respect to each of the coefficients of the velocity feedforward processing unit included in the state S, for example.

When the coefficients $a_i$ and $b_j$ of the velocity feedforward processing unit 308 are increased or decreased, the state S transitions to the state S', and a plus reward (a positive reward) is offered in return, the action information generation unit 1023 may select a policy where an action A' that leads to the value of the position error becoming further decreased, such as by incrementally increasing or decreasing the coefficients $a_i$ and $b_j$ of the velocity feedforward processing unit 308 similarly to the previous action, is selected as the next action A'.

In contrast, when a minus reward (a negative reward) is offered in return, the action information generation unit 1023 may select a policy where an action A' that leads to the position error becoming smaller than the previous value, such as by incrementally decreasing or increasing the coefficients $a_i$ and $b_j$ of the velocity feedforward processing unit 308 contrarily to the previous action, is selected as the next action A'.

The action information generation unit 1023 may select a policy where the action A' is selected according to a known method such as a greedy method where an action A' having the highest value function Q(S,A) among the values of presently estimated actions A is selected or an e-greedy method where an action A' with a certain small probability E is randomly selected and an action A' having the highest value function Q(S,A) is selected in other cases.

The action information output unit 103 is a unit that outputs the action information A and the evaluation function change information output from the learning unit 102 to the output device 200. As described above, the servo control device 300 finely adjusts the present state S (that is, the presently set coefficients $a_i$ and $b_j$ of the velocity feedforward processing unit 308) based on the action information acquired via the output device 200 to thereby transition to the next state S' (that is, the corrected coefficients of the velocity feedforward processing unit 308).

The value function storage unit 104 is a storage device that stores the value function Q. The value function Q may be stored as a table (hereinafter referred to as an action value table) for each state S and each action A, for example. The value function Q stored in the value function storage unit 104 is updated by the value function updating unit 1022. Moreover, the value function Q stored in the value function storage unit 104 may be shared with other machine learning devices 100. When the value function Q is shared by a plurality of machine learning devices 100, since reinforcement learning can be performed in distributed manner in the respective machine learning devices 100, it is possible to improve the efficiency of the reinforcement learning.

The optimization action information output unit 105 generates the action information A (hereinafter referred to as "optimization action information") which causes the velocity feedforward processing unit 308 to perform an operation of maximizing the value function Q(S,A) based on the value function Q updated by the value function updating unit 1022 performing the Q-learning. More specifically, the optimization action information output unit 105 acquires the value function Q stored in the value function storage unit 104. As described above, the value function Q is updated by the value function updating unit 1022 performing the Q-learning. The optimization action information output unit 105 generates the action information based on the value function Q and outputs the generated action information to the output device 200. The optimization action information includes information that corrects the coefficients $a_i$ and $b_j$ of the velocity feedforward processing unit 308 and evaluation function change information similarly to the action information that the action information output unit 103 outputs in the process of Q-learning.

As described above, by using the machine learning device 100 according to the present embodiment, it is possible to simplify the adjustment of the parameters of the velocity feedforward processing unit 308 of the servo control device 300.

In the embodiment described above, a case in which the machine learning device 100 performs learning related to optimization of the coefficients of the velocity feedforward processing unit during a linear operation where the rotation direction of the servo motor in the X-axis direction and the Y-axis direction is not changed has been described. However, the present invention is not limited to a learning operation during linear operation but can be applied to a learning operation during a nonlinear operation. For example, when learning related to optimization of the coefficients of the velocity feedforward processing unit is performed in order to correct a backlash, a difference between the position command value and the detection position output from the integrator 108 at the positions A2 and A4 and the positions B2 and B4 of the above-described machining shape may be extracted as a position error and reinforcement learning may be performed by giving a reward using the position error as determination information. At the positions A2 and A4 and the positions B2 and B4, the rotation direction of the servo motor in the Y-axis direction or the X-axis direction is reversed whereby a nonlinear operation is performed and a backlash occurs. In this case, the machine learning device can perform learning of the coefficients of the transfer function of the feedforward processing unit during the nonlinear operation. Hereinabove, the output device and the control device according to the first embodiment have been described. Next, an output device and a control device according to the second and third embodiments will be described.

Second Embodiment

Figure 18:
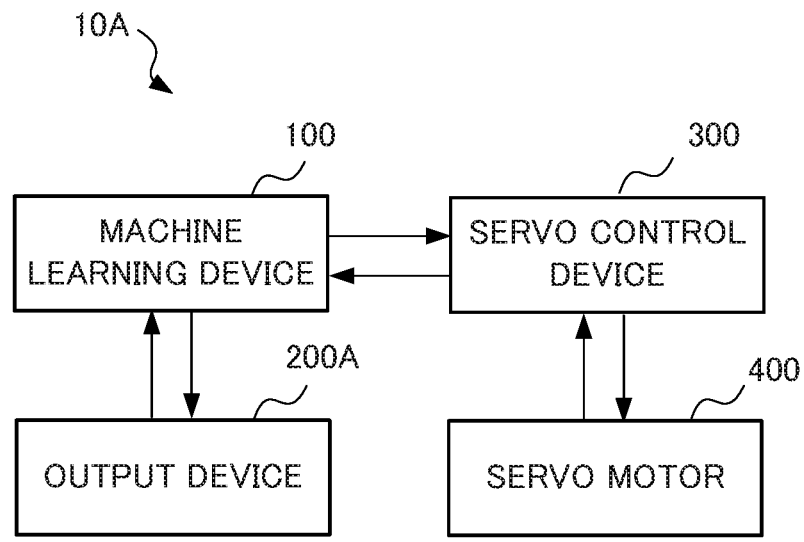
FIG. 18 is a block diagram illustrating a configuration example of a control device according to a second embodiment of the present invention.

In the first embodiment, the output device 200 is connected to the servo control device 300 and the machine learning device 100 to relay information between the machine learning device 100 and the servo control device 300 and control the operations of the servo control device 300 and the machine learning device 100. In the present embodiment, a case in which the output device is connected to the machine learning device only will be described. FIG. 18 is a block diagram illustrating a configuration example of a control device according to the second embodiment of the present invention. A control device 10A includes the machine learning device 100, an output device 200A, the servo control device 300, and the servo motor 400. The output device 200A does not include the information acquisition unit 217 and the information output unit 218 unlike the output device 200 illustrated in FIG. 2.

Since the output device 200A is not connected to the servo control device 300, the output device 200A does not relay information between the machine learning device 100 and the servo control device 300 and does not transmit and receive information to and from the servo control device 300. Specifically, although the output device 200A issues a learning program activation instruction in step S31, outputs physical amounts of parameters in step S33, and issues a relearning instruction in step S35 illustrated in FIG. 13, the output device 200A does not perform the other operations (for example, steps S32 and S34) illustrated in FIG. 13. By doing so, since the output device 200A is not connected to the servo control device 300, the number of operations performed by the output device 200A decreases and a device configuration can be simplified.

Third Embodiment

Figure 19:
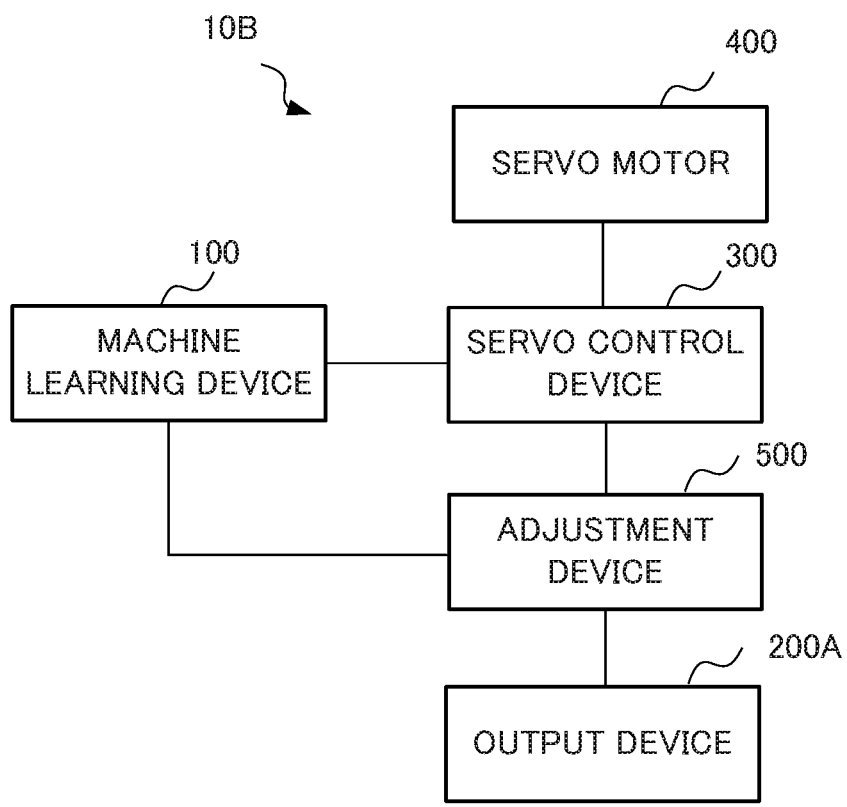
FIG. 19 is a block diagram illustrating a configuration example of a control device according to a third embodiment of the present invention.

In the first embodiment, the output device 200 is connected to the servo control device 300 and the machine learning device 100. In the present embodiment, a case in which an adjustment device is connected to the machine learning device 100 and the servo control device 300, and an output device is connected to the adjustment device will be described. FIG. 19 is a block diagram illustrating a configuration example of a control device according to the third embodiment of the present invention. A control device 10B includes the machine learning device 100, the output device 200A, the servo control device 300, and an adjustment device 500. Although the output device 200A illustrated in FIG. 19 has the same configuration as the output device 200A illustrated in FIG. 18, the information acquisition unit 211 and the information output unit 212 are connected to the adjustment device 500 rather than the machine learning device 100. The adjustment device 500 has a configuration in which the drawing creation unit 203, the operating unit 204, the display unit 209, and the arithmetic unit 2100 of the output device 200 in FIG. 2 are removed.

The output device 200A illustrated in FIG. 19 issues a learning program activation instruction in step S31, outputs physical amounts of parameters in step S33, issues an instruction to finely adjust the parameters in step S34 illustrated in FIG. 13, and issues a relearning instruction in step S35 similarly to the output device 200A illustrated in FIG. 18 of the second embodiment, and these operations are performed via the adjustment device 500. The adjustment device 500 relays information between the machine learning device 100 and the servo control device 300. Moreover, the adjustment device 500 relays a learning program activation instruction and the like with respect to the machine learning device 100, performed by the output device 200A to output an activation instruction to the machine learning device 100 respectively. By doing so, since the functions of the output device 200 are distributed to the output device 200A and the adjustment device 500 as compared to the first embodiment, the number of operations performed by the output device 200A decreases and a device configuration can be simplified.

While respective embodiments of the present invention have been described, the servo control device described above and the components included in the machine learning device and the output device may be realized by hardware, software or a combination thereof. The servo control method performed by cooperation of the components included in the servo control device described above also may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)).

The above-described embodiment is a preferred embodiment of the present invention. However, the scope of the present invention is not limited to the above-described embodiment and example only but the present invention can be embodied in various modifications without departing from the spirit of the present invention.

<Modification in Which Output Device is Included in Servo Control Device or Machine Learning Device>

In the above-described embodiments, the first and second embodiments in which the machine learning device 100, the output device 200 or 200A, and the servo control device 300 are configured as the control device 10 and the third embodiment in which the output device 200 is provided in the control device in a state of being divided into the output device 200A and the adjustment device 500 have been described. In these embodiments, although the machine learning device 100, the output device 200 or 200A, the servo control device 300, and the adjustment device 500 are configured as separate devices, these devices may be integrated into another single device. For example, a part or all of the functions of the output device 200 or 200A may be realized by the machine learning device 100 or the servo control device 300. Moreover, the output device 200 or 200A may be provided outside a control device formed by the machine learning device 100 and the servo control device 300.

<Freedom in System Configuration>

FIG. 20 is a block diagram illustrating a control device according to another embodiment of the present invention. As illustrated in FIG. 20, a control device 10C includes n machine learning devices 100-1 to 100-$n$, n output devices 200-1 to 200-$n$, n servo control devices 300-1 to 300-$n$, servo motors 400-1 to 400-$n$, and a network 600. n is an arbitrary natural number. Each of the n machine learning devices 100-1 to 100-$n$ corresponds to the machine learning device 100 illustrated in FIG. 17. Each of the n output devices 200-1 to 200-$n$ corresponds to the output device 200 illustrated in FIG. 2 or the output device 200A illustrated in FIG. 18. Each of the n servo control devices 300-1 to 300-$n$ corresponds to the servo control device 300 illustrated in FIG. 2. The output device 200A and the adjustment device 500 illustrated in FIG. 19 correspond to the output devices 200-1 to 200-$n$.

Here, the output device 200-1 and the servo control device 300-1 are paired in a one-to-one relationship and are communicably connected. The output devices 200-2 to 200-$n$ and the servo control devices 300-2 to 300-$n$ are connected similarly to the output device 200-1 and the servo control device 300-1. Although n pairs of the output devices 200-1 to 200-$n$ and the servo control devices 300-1 to 300-$n$ are connected via the network 600 in FIG. 20, the n pairs of the output devices 200-1 to 200-$n$ and the servo control devices 300-1 to 300-$n$ may be connected directly via connection interfaces, respectively. A plurality of n pairs of the output devices 200-1 to 200-$n$ and the servo control devices 300-1 to 300-$n$ may be provided in the same plant, for example, and may be provided in different plants.

The network 600 is a local area network (LAN) constructed in a plant, the Internet, a public telephone network, a direct connection via a connection interface, or a combination thereof, for example. A specific communication scheme of the network 600, whether the network uses a cable connection or a wireless connection, and the like are not particularly limited.

In the control device illustrated in FIG. 20, although the output devices 200-1 to 200-$n$ and the servo control devices 300-1 to 300-$n$ are communicably connected as a one-to-one correspondence, one output device 200-1 may be communicably connected to a plurality of servo control devices 300-1 to 300-$m$ (m<n or m=n) via the network 600, and one machine learning device connected to one output device 200-1 may perform machine learning of the servo control devices 300-1 to 300-$m$. In this case, a distributed processing system may be adopted, in which respective functions of the machine learning device 100-1 are distributed to a plurality of servers as appropriate. The functions of the machine learning device 100-1 may be realized by utilizing a virtual server function, or the like, in a cloud. When there are a plurality of machine learning devices 100-1 to 100-$n$ corresponding to a plurality of servo control devices 300-1 to 300-$n$, respectively, of the same type name, the same specification, or the same series, the machine learning devices 100-1 to 100-n may be configured to share learning results in the machine learning devices 100-1 to 100-n. By doing so, a more optimal model can be constructed.

EXPLANATION OF REFERENCE NUMERALS

- 10, 10A, 10B, 10C: Control device
- 100: Machine learning device
- 200: Output device
- 211: Information acquisition unit
- 212: Information output unit
- 213: Drawing creation unit
- 214: Operating unit
- 215: Control unit
- 216: Storage unit
- 217: Information acquisition unit
- 218: Information output unit
- 219: Display unit
- 300: Servo control device
- 400: Servo motor
- 500: Adjustment device
- 600: Network

What is claimed is:

1. An output device comprising:
a non-transitory memory configured to store a program;
a hardware processor configured to execute the program and control the output device to:
output a plurality of evaluation functions used by a machine learning device that performs machine learning of parameters of components of a servo control device that controls a servo motor that drives an axis of a machine tool, a robot, or an industrial machine and output a machine learning result of each of the evaluation functions, and
acquire the machine learning result from at least the servo control device or the machine learning device; and
a display that displays the plurality of evaluation functions and each respective machine learning result on the display screen.

2. The output device according to claim 1, wherein hardware processor is further configured to execute the program and control the output device to:
output a parameter selected on the basis of the machine learning result of each of the plurality of evaluation functions from a plurality of parameters machine-learned using the plurality of evaluation functions to the servo control device.

3. The output device according to claim 2, wherein the parameters of the components of the servo control device include parameters of a numerical expression model or a filter.

4. The output device according to claim 3, wherein the parameters include coefficients of a transfer function of the filter.

5. The output device according to claim 1, wherein hardware processor is further configured to execute the program and control the output device to:
output a change instruction to an evaluation function selected from the plurality of evaluation functions or an evaluation function different from the plurality of evaluation functions to the machine learning device.

6. The output device according to claim 5, wherein the machine learning device stores the parameters of the components of the servo control device retrieved during machine learning using the evaluation function and the machine learning result obtained by operating the servo control device using the parameters and obtains an evaluation function value on the basis of a changed evaluation function using the stored machine learning result when machine learning is performed while changing the evaluation function on the basis of the change instruction and the same parameters as the parameters are selected.

7. The output device according to claim 5, wherein the different evaluation function is an evaluation function of which a weighting coefficient is different from that of the plurality of evaluation functions.

8. The output device according to claim 1, wherein the machine learning result is an error between a control command of the servo control device and feedback information when the servo motor was driven on the basis of the control command.

9. The output device according to claim 1, wherein the plurality of evaluation functions includes an evaluation function made up of a weighted sum of a function in which a position error is a variable, a function in which a differential value of a position error is a variable, and a function in which a differential value of a torque is a variable.

10. A control device comprising:
the output device according to claim 1;
a servo control device that controls a servo motor that drives an axis of a machine tool, a robot, or an industrial machine, and
a machine learning device that performs machine learning with respect to the servo control device.

11. The control device according to claim 10, wherein the output device is included in one of the servo control device and the machine learning device.

12. The output device according to claim 1, wherein the hardware processor is further configured to execute the program to display a part or all of the plurality of evaluation functions and the machine learning results as a time response of a position error corresponding to each evaluation function on the display screen.

13. An output method for allowing an output device to output an evaluation function and a machine learning result, comprising:
outputting a machine learning result of each of the evaluation functions obtained by performing machine learning using a plurality of evaluation functions respectively with the aid of a learning device that performs machine learning using the evaluation function with respect to a servo control device that controls a servo motor that drives an axis of a machine tool, a robot, or an industrial machine;
acquiring the machine learning result from at least the servo control device or the machine learning device; and
a displaying the plurality of evaluation functions and each respective machine learning result on a display screen.

* * * * *